US012203306B2

(12) United States Patent
Duer

(10) Patent No.: US 12,203,306 B2
(45) Date of Patent: Jan. 21, 2025

(54) GUIDE SYSTEM

(71) Applicant: Julius Blum GmbH, Hoechst (AT)

(72) Inventor: Stefan Duer, Schwarzach (AT)

(73) Assignee: JULIUS BLUM GMBH, Hoechst (AT)

(*) Notice: Subject to any disclaimer, the term of this patent is extended or adjusted under 35 U.S.C. 154(b) by 0 days.

(21) Appl. No.: 18/070,942

(22) Filed: Nov. 29, 2022

(65) Prior Publication Data

US 2023/0090428 A1 Mar. 23, 2023

Related U.S. Application Data

(63) Continuation of application No. PCT/AT2021/060188, filed on May 31, 2021.

(30) Foreign Application Priority Data

Jun. 5, 2020 (AT) .............................. A 50495/2020

(51) Int. Cl.
*E05D 15/26* (2006.01)
*E05D 3/12* (2006.01)
(Continued)

(52) U.S. Cl.
CPC ............. *E05D 15/264* (2013.01); *E05D 3/12* (2013.01); *E05D 15/58* (2013.01); *E05F 1/12* (2013.01)

(58) Field of Classification Search
CPC ... E05D 15/264; E05D 15/06; E05D 15/0604; E05D 15/0626; E05D 15/14; E05D 15/58;
(Continued)

(56) References Cited

U.S. PATENT DOCUMENTS 1,873,522 A 10/1930 Abbott et al.
5,991,975 A 11/1999 Baer
(Continued)

FOREIGN PATENT DOCUMENTS

DE 10 2014 018 682 6/2016
EP 2 071 108 6/2009
(Continued)

OTHER PUBLICATIONS

International Search Report issued Sep. 10, 2021 in International (PCT) Application No. PCT/AT2021/060188.

*Primary Examiner* — Jeffrey O'Brien
(74) *Attorney, Agent, or Firm* — Wenderoth, Lind & Ponack, L.L.P.

(57) ABSTRACT

A guide system includes a guide rail and a guiding device, and is movably supported between a retracted end position and an extended end position along the guide rail. A cover can cover a front face of the guide rail, and is movable between a first operating position, in which the cover at least partially covers the front face of the guide rail, and a second operating position, in which the cover at least partially reveals the front face. An actuating device can move the cover from the first operating position into the second operating position, and a coupling device can releasably couple the guiding device to the actuating device in a partial section of the guide rail. When coupled, the actuating device can be entrained by the guiding device so as to move the cover from the first operating position into the second operating position.

24 Claims, 22 Drawing Sheets

(51) Int. Cl.
*E05D 15/58* (2006.01)
*E05F 1/12* (2006.01)

(58) Field of Classification Search
CPC ........ E05D 2015/585; E05D 2015/586; E05D 3/12; E05F 1/12; E05Y 2201/11; E05Y 2900/212
See application file for complete search history.

(56) References Cited

U.S. PATENT DOCUMENTS

| | | | | |
|---|---|---|---|---|
| 8,303,056 | B2 | 11/2012 | Giorgi | |
| 9,428,946 | B2 | 8/2016 | Martinez Garcia et al. | |
| 11,008,791 | B2 | 5/2021 | Rupp et al. | |
| 11,629,540 | B2 * | 4/2023 | Blum | E05D 7/0407 16/242 |
| 11,828,096 | B2 * | 11/2023 | Koenig | E05D 13/04 |
| 11,866,973 | B2 | 1/2024 | Meusburger et al. | |
| 2010/0117500 | A1 | 5/2010 | Giorgi | |
| 2015/0233161 | A1 | 8/2015 | Martinez Garcia et al. | |
| 2018/0128032 | A1 * | 5/2018 | Karle | E05F 15/635 |
| 2019/0301218 | A1 | 10/2019 | Rupp et al. | |
| 2022/0056744 | A1 * | 2/2022 | Duer | E05D 15/58 |
| 2022/0074250 | A1 * | 3/2022 | Duer | E05D 15/264 |
| 2022/0120127 | A1 | 4/2022 | Meusburger et al. | |
| 2022/0316252 | A1 * | 10/2022 | Irgang | E05D 15/58 |
| 2023/0323721 | A1 * | 10/2023 | Hammerer | E05D 15/264 49/258 |
| 2023/0332447 | A1 * | 10/2023 | Music | E05D 15/264 |

FOREIGN PATENT DOCUMENTS

| | | |
|---|---|---|
| EP | 2 899 344 | 7/2015 |
| JP | 2022-533169 | 7/2022 |
| JP | 2022-539886 | 9/2022 |
| TW | 201839244 | 11/2018 |
| WO | 99/23337 | 5/1999 |
| WO | 2020/232490 | 11/2020 |

* cited by examiner

GUIDE SYSTEM

BACKGROUND OF THE INVENTION

The present invention relates to a guide system for guiding at least one movably-supported door wing relative to at least one stationary furniture part. The guide system includes: at least one guide rail configured to be arranged on the at least one furniture part, and at least one guiding device on which the at least one door wing can be pivotally supported, the at least one guiding device being movably supported between a retracted end position and an extended end position along the at least one guide rail. At least one cover is configured to cover at least one front face of the at least one guide rail, the at least one cover being movable at least between a first operating position, in which the cover at least partially covers the at least one front face of the at least one guide rail, and a second operating position, in which the at least one cover at least partially reveals the at least one front face, and at least one actuating device for moving the at least one cover at least from the first operating position into the second operating position.

Moreover, the invention concerns a method for moving at least one movably-supported door wing relative to a stationary furniture part by means of the at least one guide system of the type to be described.

Finally, the invention relates to an item of furniture comprising at least one door wing, in particular a sliding door or a folding-sliding door, a stationary furniture part, and at least one guide system of the type to be described.

Items of furniture with a movably-supported cover for covering a gap located between two furniture parts have been known, for example, from EP 2 899 344 A1, EP 2 071 108 A1 and WO 99/23337 A1.

DE 10 2014 018 682 B3 discloses an item of furniture comprising a furniture carcass and a plurality of folding-door elements which can be transferred from a first position, in which the furniture carcass can be covered, into a second position, in which the folded folding-door elements can be received in an upper receiving compartment of the furniture carcass. The folding-door elements can be lifted from the first position relative to the furniture carcass by a first electric drive. Subsequently, the folding-door elements can be moved into the upper receiving compartment of the furniture carcass by a second electric drive. Moreover, a movably-supported closing flap is provided which can be actuated by a drive chain configured to be driven by the second electric drive. By the closing flap, the upper receiving compartment of the furniture carcass can be closed when the folding-door elements are located within the receiving compartment.

By the cover of such a guide system, a receiving compartment for receiving the at least one door wing and a front face of the guide rail for displaceably supporting the door wing can be at least partially covered, the front face of the guide rail being located within the receiving compartment. By movably supporting the cover, it can be provided that the cover partially covers the receiving compartment in the first operating position, and an extension movement of the door wing can be made possible in the second operating position. However, upon the extension movement of the door wing, there is the considerable danger that the door wing and the cover can collide with each other or can get jammed with each other.

SUMMARY OF THE INVENTION

It is an object of the present invention to propose a guide system of the type mentioned in the introductory part, thereby avoiding the above-discussed drawbacks and, in particular, to improve the control of a movement of the cover.

According to the invention, at least one coupling device is provided, the at least one coupling device being configured to releasably couple the at least one guiding device to the at least one actuating device in a partial section of the at least one guide rail, the partial section preceding, preferably immediately, the extended end position. The at least one actuating device, in a coupled condition with the at least one guiding device, can be entrained by the at least one guiding device so as to move the at least one cover from the first operating position into the second operating position.

In other words, the guiding device, on which the at least one door wing can be supported, is freely movable over a majority of its movement path between the retracted end position and the extended end position, and is only releasably coupled shortly before reaching the extended end position via the coupling device to the actuating device for actuating a movement of the cover. In this way, it can be ensured that the cover is moved into the second operating position before the guiding device reaches its extended end position. As a result, a collision between the cover and the extending door wing can be effectively prevented.

BRIEF DESCRIPTION OF THE DRAWINGS

Further details and advantages of the present invention result from the following description of figures.

DETAILED DESCRIPTION OF THE INVENTION

Figure 1A:
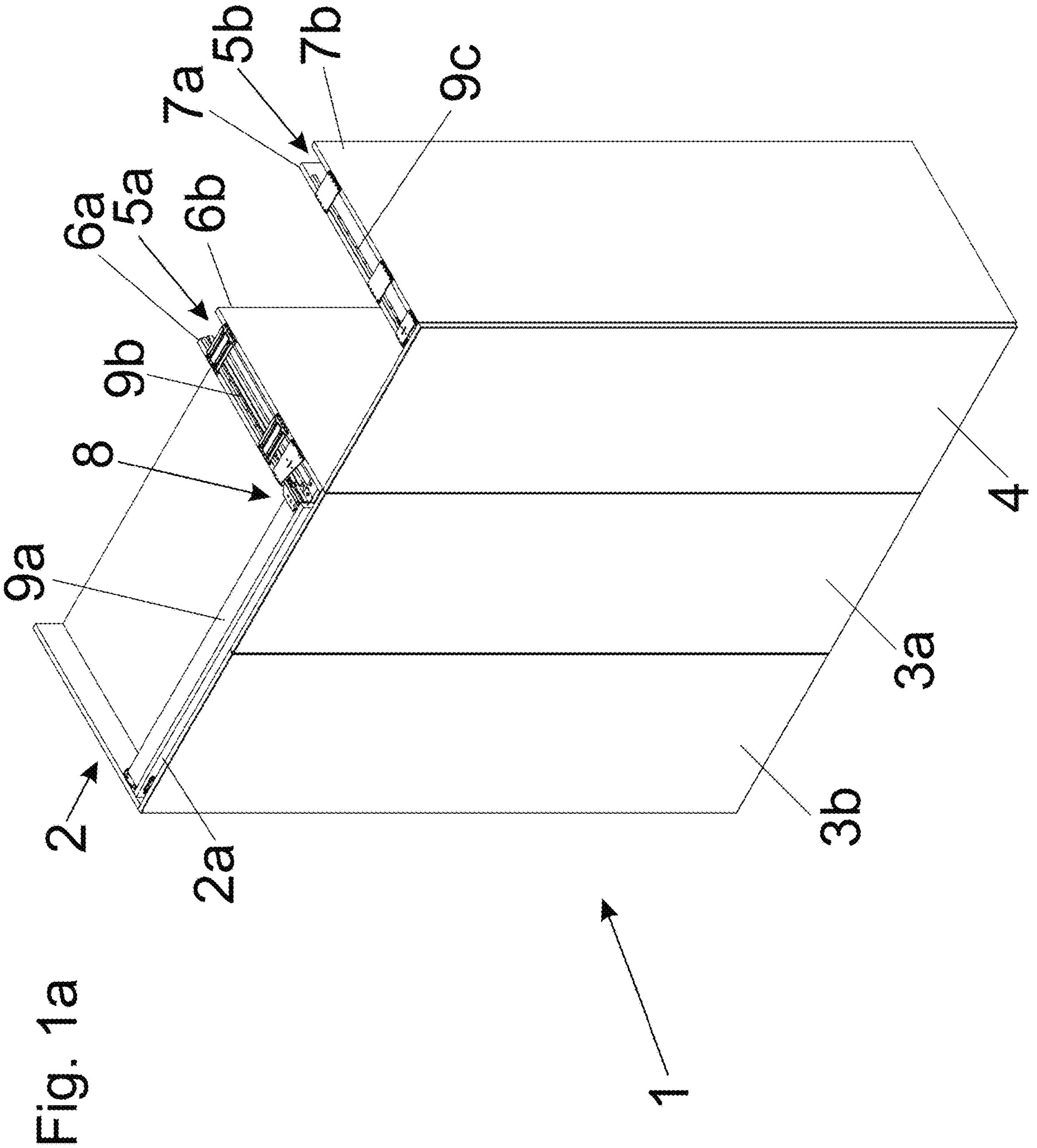
FIG. 1*a*, 1*b* are perspective views of an item of furniture comprising a furniture carcass and door wings movable relative to the furniture carcass, the door wings being located in two different positions.

FIG. 1*a* shows a perspective view of an item of furniture 1 comprising a furniture carcass 2 and door wings 3*a*, 3*b*, 4 configured to be moved relative to the furniture carcass 2. The door wings 3*a*, 3*b* are hingedly connected to one another via a vertically extending axis. The door wings 3*a*, 3*b*, 4 can be configured as a sliding door or as a folding-sliding door.

The door wings 3*a*, 3*b* are movably supported by a guide system 8 between a first position, in which the door wings 3*a*, 3*b* are aligned substantially coplanar to one another, and a second position, in which the door wings 3*a*, 3*b* are aligned substantially parallel to one another. In the first (coplanar) position, the door wings 3*a*, 3*b* substantially entirely cover the furniture carcass 2. In the second (parallel) position, the door wings 3*a*, 3*b* can be inserted into a receiving compartment 5*a* of the furniture carcass 2. In the shown embodiment, the receiving compartment 5*a* is formed by two sidewalls 6*a*, 6*b* mutually spaced from each other in a substantially parallel relationship.

The guide system 8 includes a longitudinal rail 9*a* for guiding the door wings 3*a*, 3*b*. The longitudinal rail 9*a* is configured so as to guide the door wings 3*a*, 3*b* along a front face 2*a* of the furniture carcass 2. By a guide rail 9*b* extending transversely to the longitudinal rail 9*a*, the door wings 3*a*, 3*b* can be guided along the sidewall 6*a* of the furniture carcass 2.

On the contrary, the door wing 4 can be in the form of a single door wing 4 configured to be aligned coplanar to the two other door wings 3*a*, 3*b* in a first position. In a second position, in which the door wing 4 can be aligned substantially parallel to a panel-shaped furniture part 7*a*, the door wing 4 can be inserted along a guide rail 9*c* into a further receiving compartment 5*b* of the furniture carcass 2. The receiving compartment 5*b* for receiving the door wing 4 is formed by two stationary, panel-shaped furniture parts 7*a*, 7*b* which are mutually spaced from each other in a substantially parallel relationship.

Figure 1B:
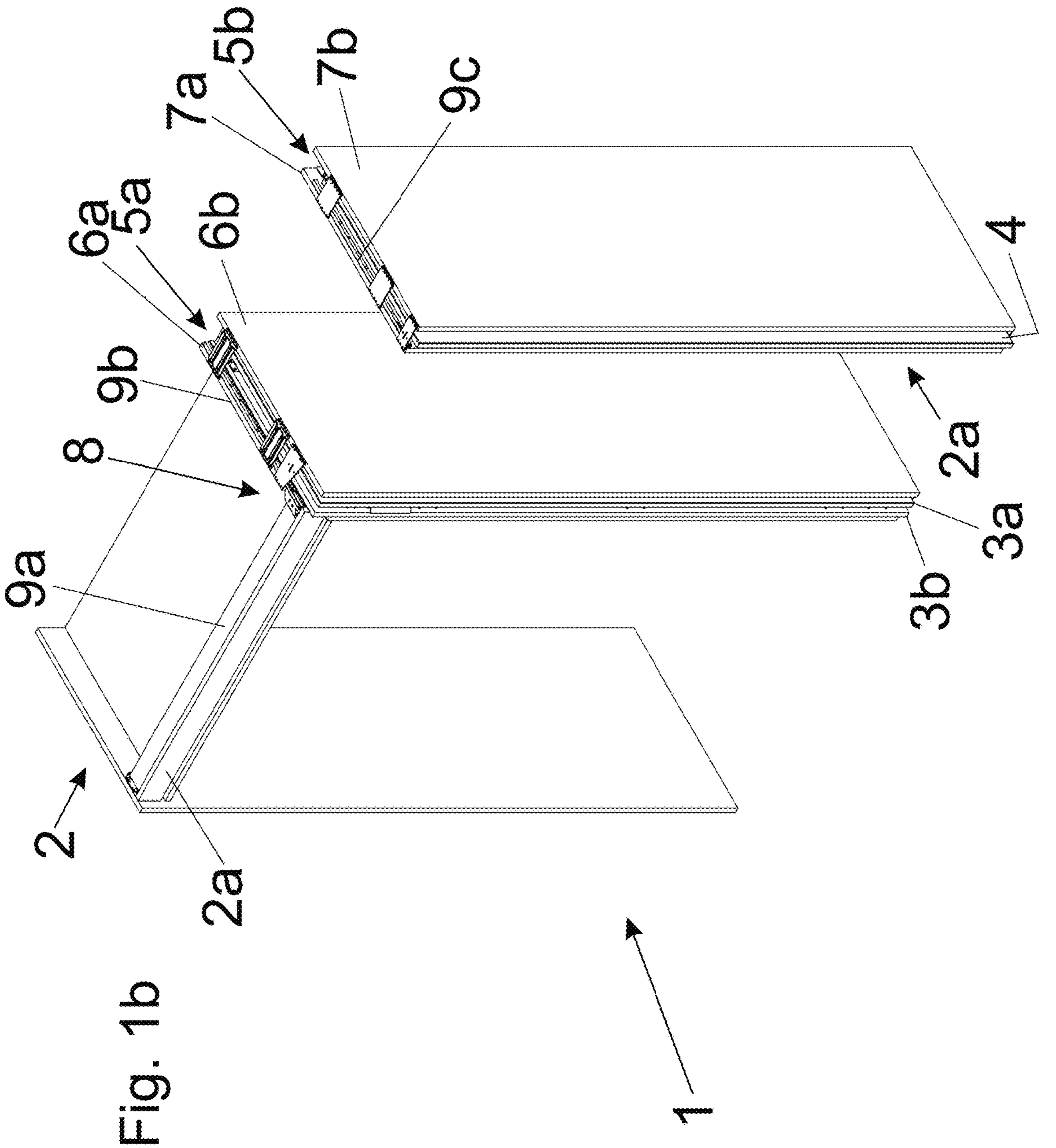

FIG. 1*b* shows the item of furniture 1 according to FIG. 1*a*, in which the door wings 3*a*, 3*b*, in parallel position to one another, are received within the receiving compartment 5*a*. On the contrary, the door wing 4 is inserted into the receiving compartment 5*b* formed by the two panel-shaped furniture parts 7*a*, 7*b*. The item of furniture 1 includes at least one interior space 2*a* which can be at least partially covered by the at least one door wing 4. In the interior space 2*a*, kitchen furniture and kitchenware can be arranged for example.

Figure 2A:
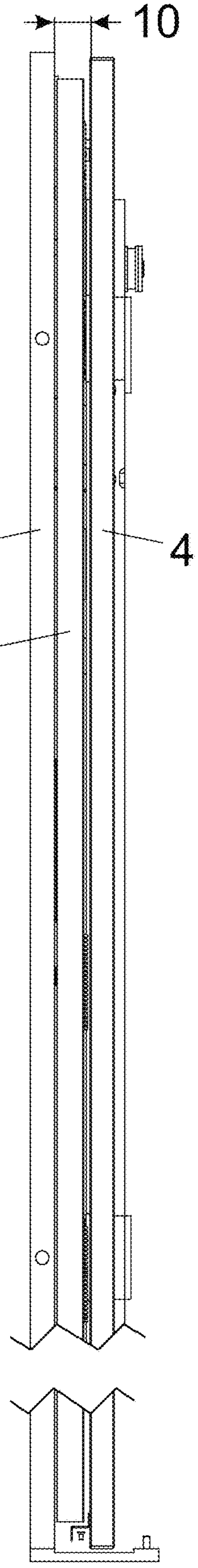
FIG. 2*a*-2*c* show a door wing inserted into the receiving compartment in a view from the front and two further detail views thereof.

FIG. 2*a* shows the door wing 4 in a view from the front, in which the door wing 4 is aligned parallel to the panel-shaped furniture part 7*a* and is located entirely within the receiving compartment 5*b*. A vertical gap 10 is formed between the furniture part 7*a* and the door wing 4, and the gap 10 can be at least partially covered by a movably-supported cover 11. For reasons of simplicity, the functionality of the cover 11 will be described in connection with the door wing 4 and the receiving compartment 5*b*. Of course, the cover 11 can also be used in combination with the two other door wings 3*a*, 3*b* in the other receiving compartment 5*a*.

The gap 10 is arranged between the furniture part 7*a* and the door wing 4, the gap 10 having a width of approximately 3 cm for example. The gap 10 can be covered by the cover 11 in a position in which the door wing 4 is inserted within the receiving compartment 5*b*. The cover 11 can have a length corresponding substantially to a height of the door wing 4.

Figure 2B:
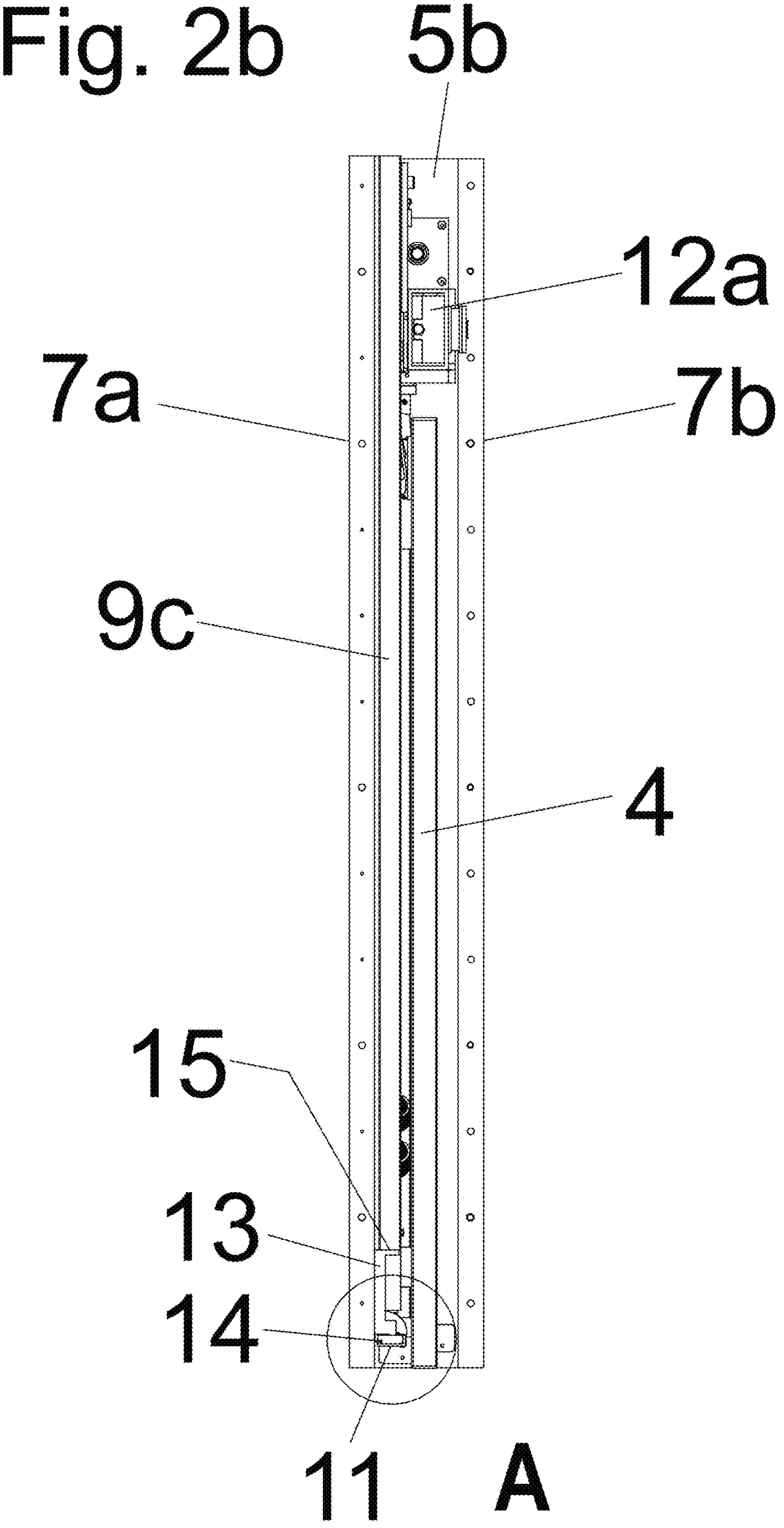

FIG. 2*b* shows the arrangement according to FIG. 2*a* in a view from the top, in which the door wing 4 is entirely countersunk within the receiving compartment 5*b* formed by the stationary furniture parts 7*a*, 7*b*. The guide rail 9*c* is fixed to the furniture part 7*a*, the guide rail 9*c* having a front face 15. The door wing 4 is pivotally supported about a vertically extending axis on a vertically extending carrier 12*a* of a guiding device 12 (FIG. 3*a*), and the carrier 12*a* is displaceable along the guide rail 9*c*. In the shown FIG. 2*b*, the carrier 12*a* of the guiding device 12 is located in the retracted end position. A mounting member 13 is fixed to the front region of the furniture part 7*a*, and the cover 11 is pivotally supported about a vertically extending axis 14 on the mounting member 13.

The cover 11 is provided so as to at least partially cover the gap 10 and/or the front face 15 of the guide rail 9*c*. The cover 11 is movably supported at least between a first operating position, in which the cover 11 at least partially covers the front face 15 of the at least one guide rail 9*c*, and a second position, in which the at least one cover 11 at least partially reveals the at least one front face 15.

Figure 2C:
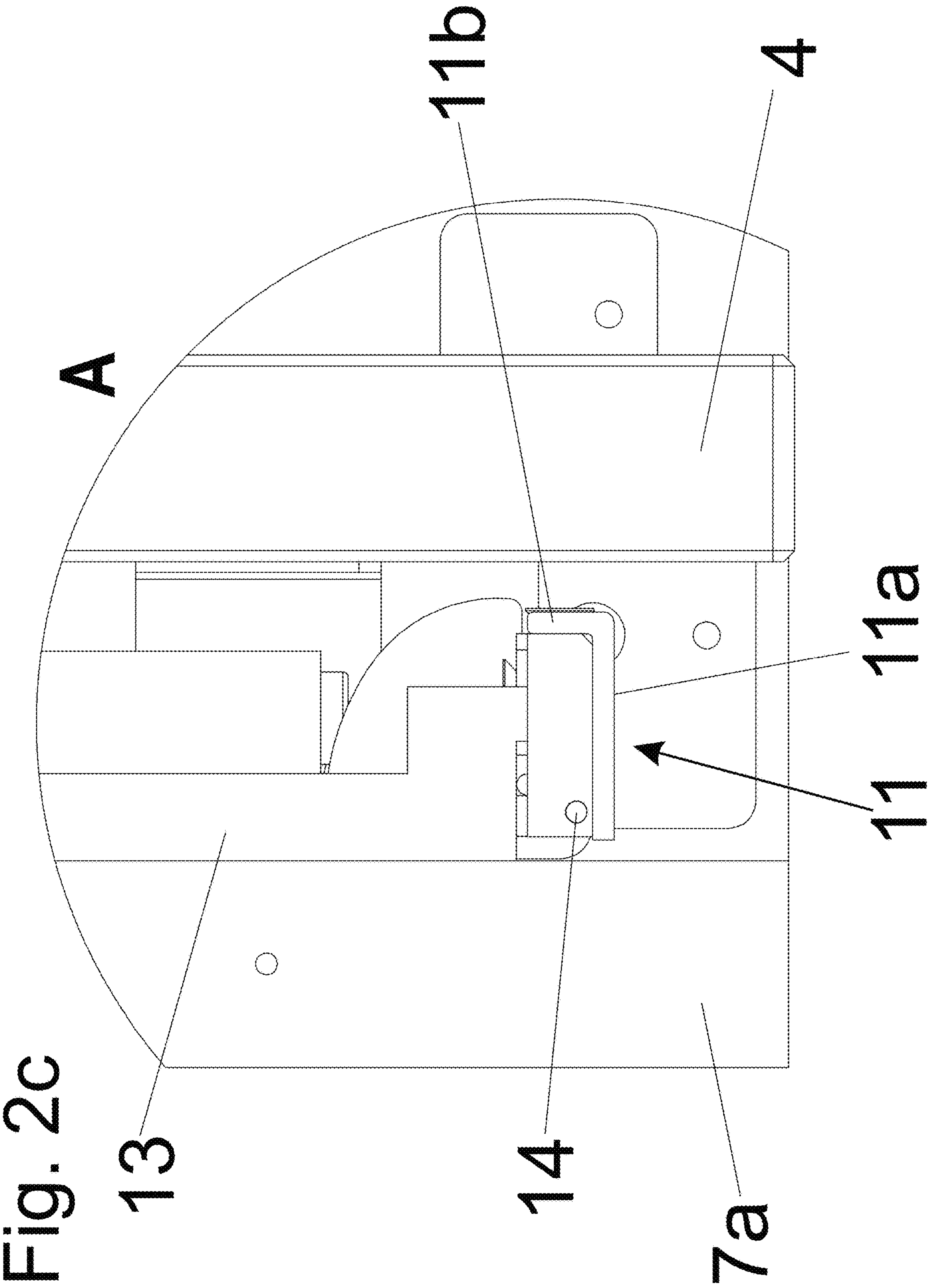

FIG. 2*c* shows the encircled region "A" of FIG. 2*b* in an enlarged view. The mounting member 13 is fixed to the furniture part 7*a*, and the cover 11 is pivotable relative to the mounting member 13 about a vertically extending axis 14. The cover 11 can include a first limb 11*a* and a second limb 11*b* protruding transversely from the first limb 11*a*. In a first operating position of the cover 11, in which the gap 10 and/or the front face 15 of the guide rail 9*c* can be covered, the first limb 11*a* is aligned substantially perpendicular to the panel-shaped furniture part 7*a*.

Figure 3A:
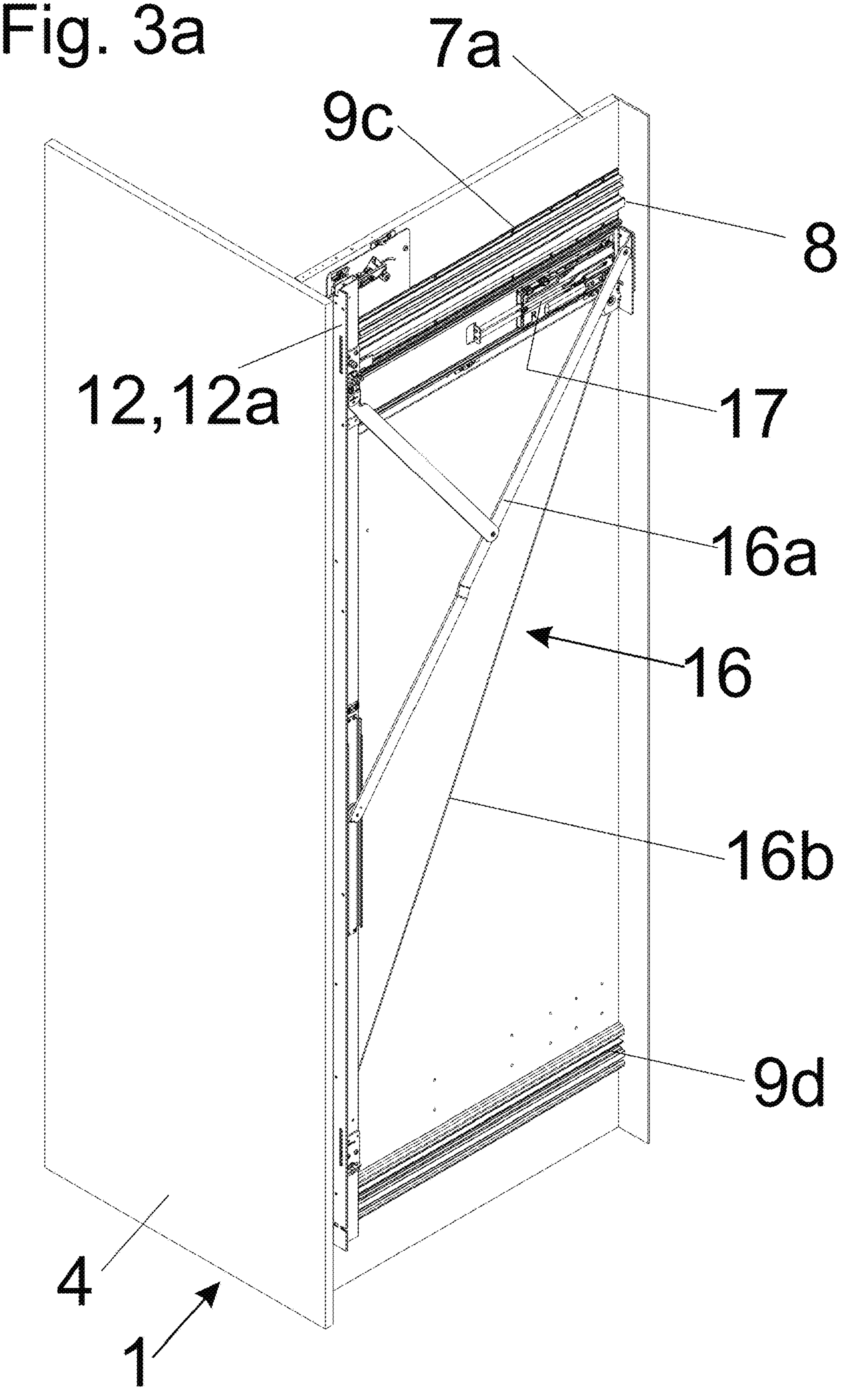
FIG. 3*a*-3*c* show the item of furniture with the guide system in different views.
Figure 3B:
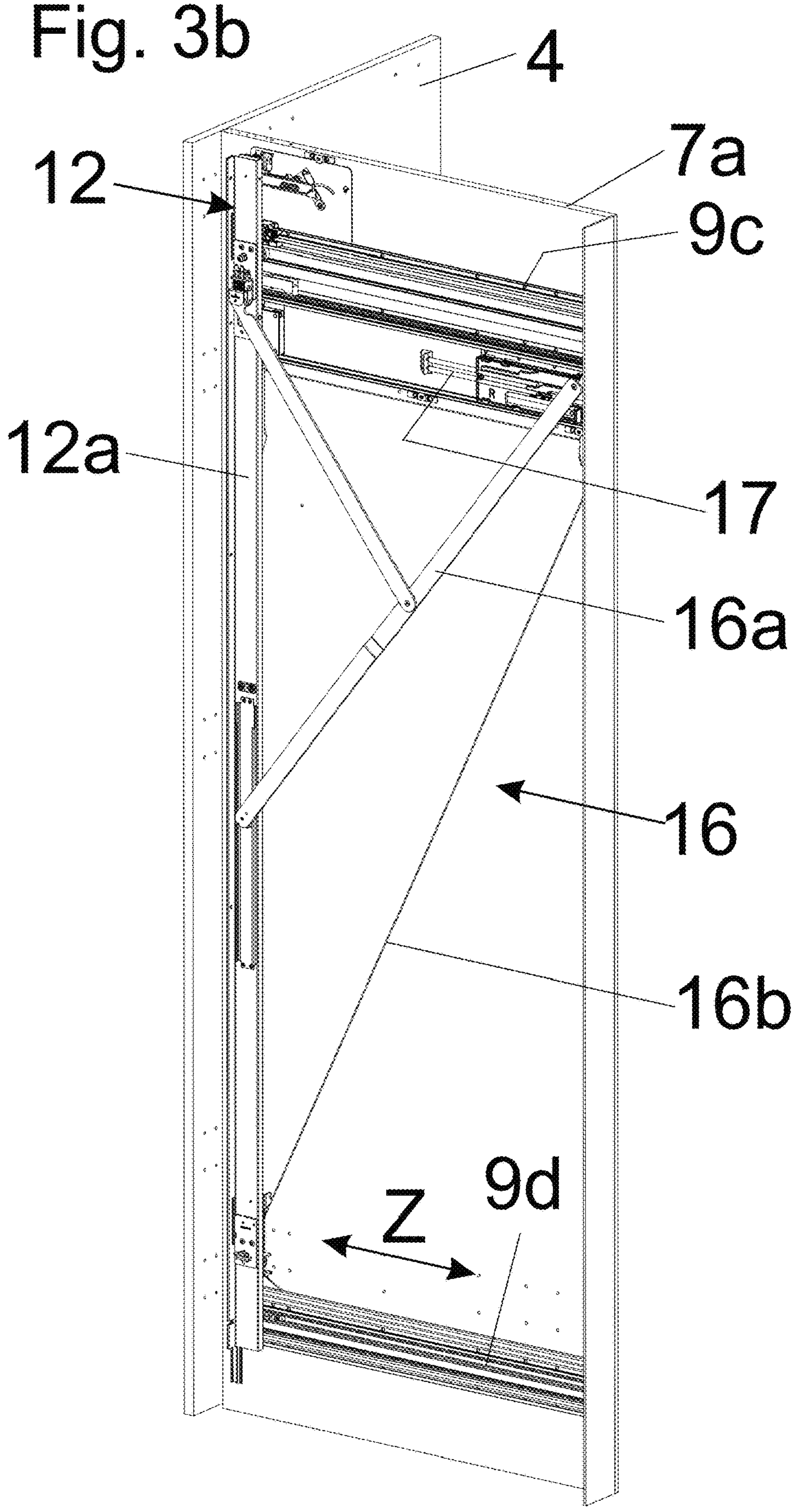
Figure 3C:
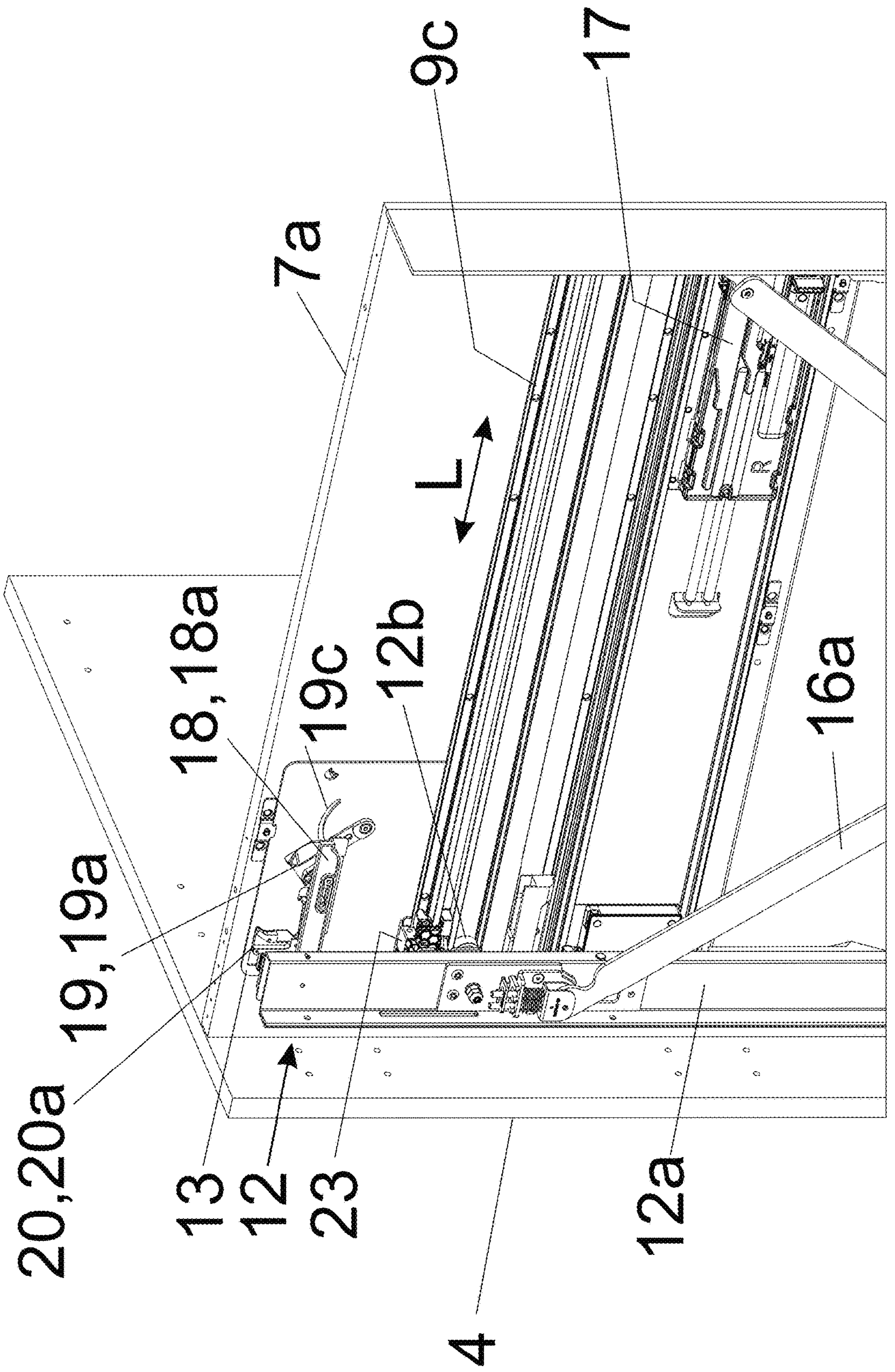

FIG. 3*a*-3*c* show the item of furniture 1 with the door wing 4 and with the guide system 8 for guiding the door wing 4. The guide system 8 includes at least one guide rail 9*c* configured to be fixed to the stationary furniture part 7*a*, and a guiding device 12 with a vertically extending, lengthy carrier 12*a* is configured to be displaced along the guide rail 9*c*. The guiding device 12 is movably supported between a retracted end position and an extended end position along the at least one guide rail 9*c*. The at least one door wing 4 is hingedly connected to the carrier 12*a*.

According to an embodiment, it can be provided that the guiding device 8

- includes at least one, preferably releasably lockable, ejection device 17 for ejecting the at least one guiding device 12 from the retracted end position in a direction of the extended end position, and/or
- includes at least one compensation device 16 for compensating for a tilting moment of the at least one guiding device 12 about a tilting axis by a return moment, preferably wherein the at least one compensation device 16 includes a scissor mechanism 16*a* and/or a cable device 16*b*, and/or
- includes at least one further guide rail 9*d*, wherein the provided guide rails 9*c*, 9*d* are to be fixed to the stationary furniture part 7*a* so as to be mutually spaced from one another in a height direction, preferably wherein the at least one guiding device 12 is movably supported along the guide rails 9*c*, 9*d*.

FIG. 3*b* shows the arrangement shown in FIG. 3*a* in a further perspective view. The carrier 12*a* of the guiding device 12 is movably supported along the guide rails 9*c*, 9*d* in a depth direction (Z) of the item of furniture 1 between the retracted end position and the extended end position.

FIG. 3*c* shows the upper region according to FIG. 3*b* in an enlarged view. The guiding device 12 includes at least one rolling body 12*b* for displaceably supporting the carrier 12*a* along the at least one guide rail 9*c*. The guiding device 12 is located in the extended end position in which the carrier 12*a* is held in position by a releasable holding device 20.

The guide system 8 includes a mounting member 13 configured to be fixed to the stationary furniture part 7*a*. A coupling device 19 having a pivotable coupling lever 19*a* for releasably coupling to the guiding device 12, an actuating device 18 having a linearly displaceable slider 18*a* for actuating the cover 11, and the holding device 20 for holding the guiding device 12 in the extended end position are supported on the mounting member 13.

By the coupling device 19, the guiding device 12 can be releasably coupled to the actuating device 18 in a partial section of the guide rail 9*c*, the partial section preceding, preferably immediately, the extended end position. The actuating device 18, in a coupled condition with the guiding device 12, can be entrained by the guiding device 12 so as to move the cover 11 from the first operating position into the second operating position.

According to an embodiment, it can be provided that the at least one guiding device and the at least one actuating device, in the extended end position and/or in a further partial section between the retracted end position and the extended end position, are decoupled from one another, the further partial section, preferably immediately, preceding the partial section in which the at least one guiding device can be releasably coupled to the at least one actuating device.

Figure 4A:
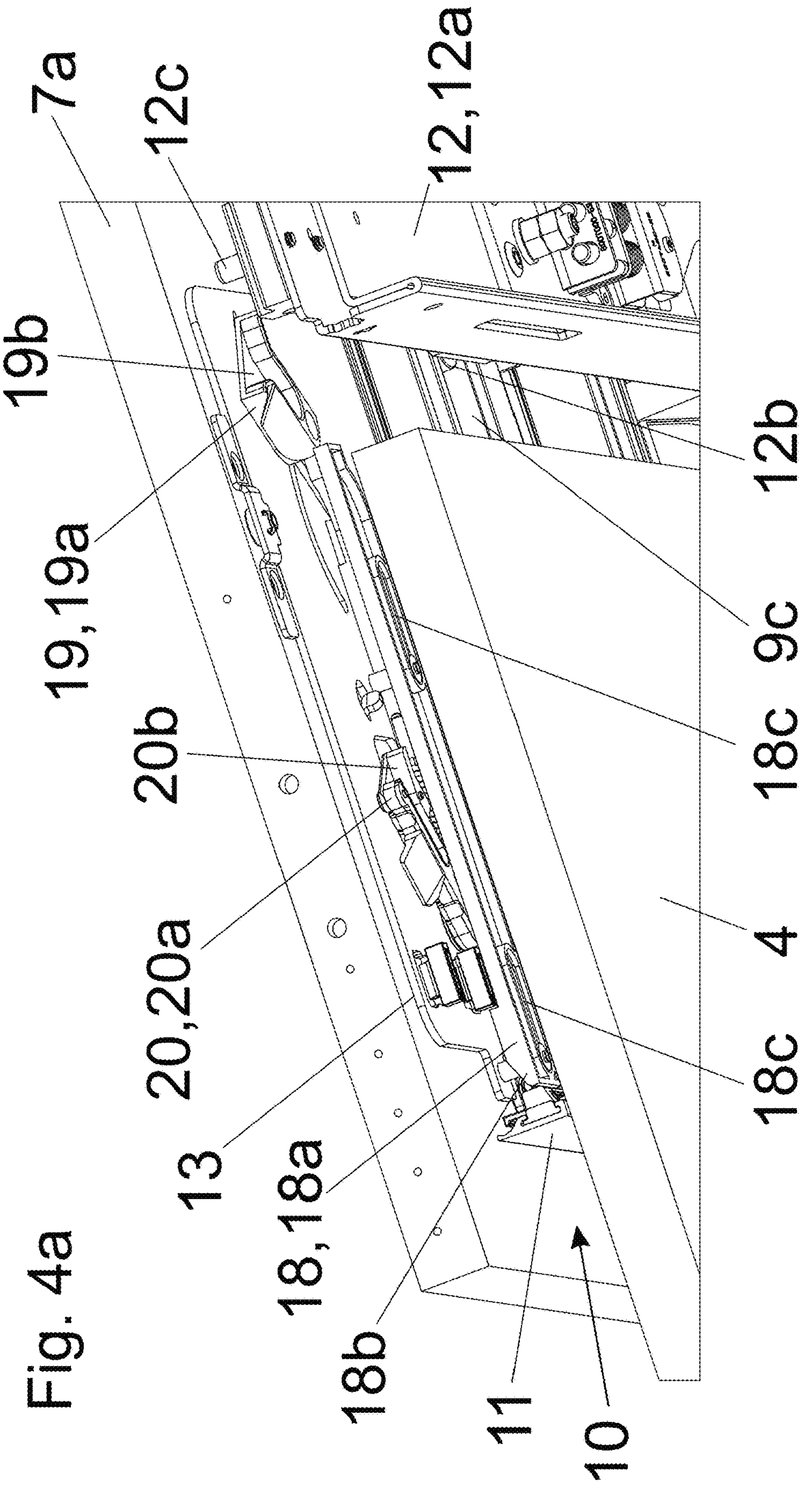
FIG. 4*a*, 4*b* show the guide system with the guiding device in an uncoupled and in a coupled condition with the coupling device.
Figure 6A:
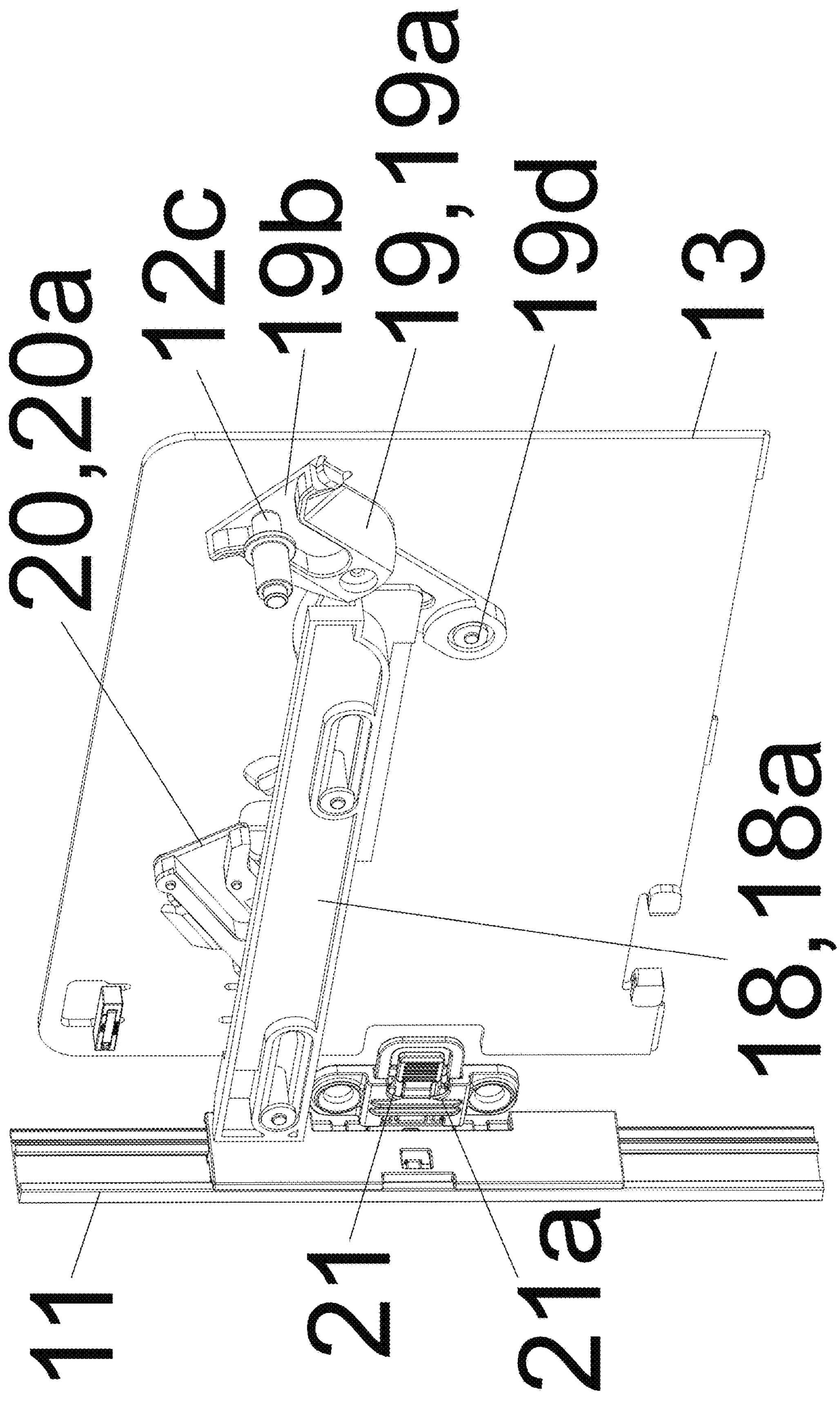
FIG. 6*a*-6*h* show the movement of the guiding device towards the extended end position in temporal sequences.

FIG. 4*a* shows the guiding device 12 with the carrier 12*a*, the carrier 12*a* being located in a partial section preceding the extended end position. The door wing 4 is thereby aligned substantially parallel to the stationary furniture part 7*a*. The mounting member 13 to be fixed to the stationary furniture part 7*a* can be seen. The coupling device 19, the holding device 20 and the actuating device 18 are supported on the mounting member 13. The cover 11 is hingedly connected to the mounting member 13, preferably via at least one hinge 21 (FIG. 6*a*).

According to an embodiment, it can be provided that the coupling device 19

Figure 4B:
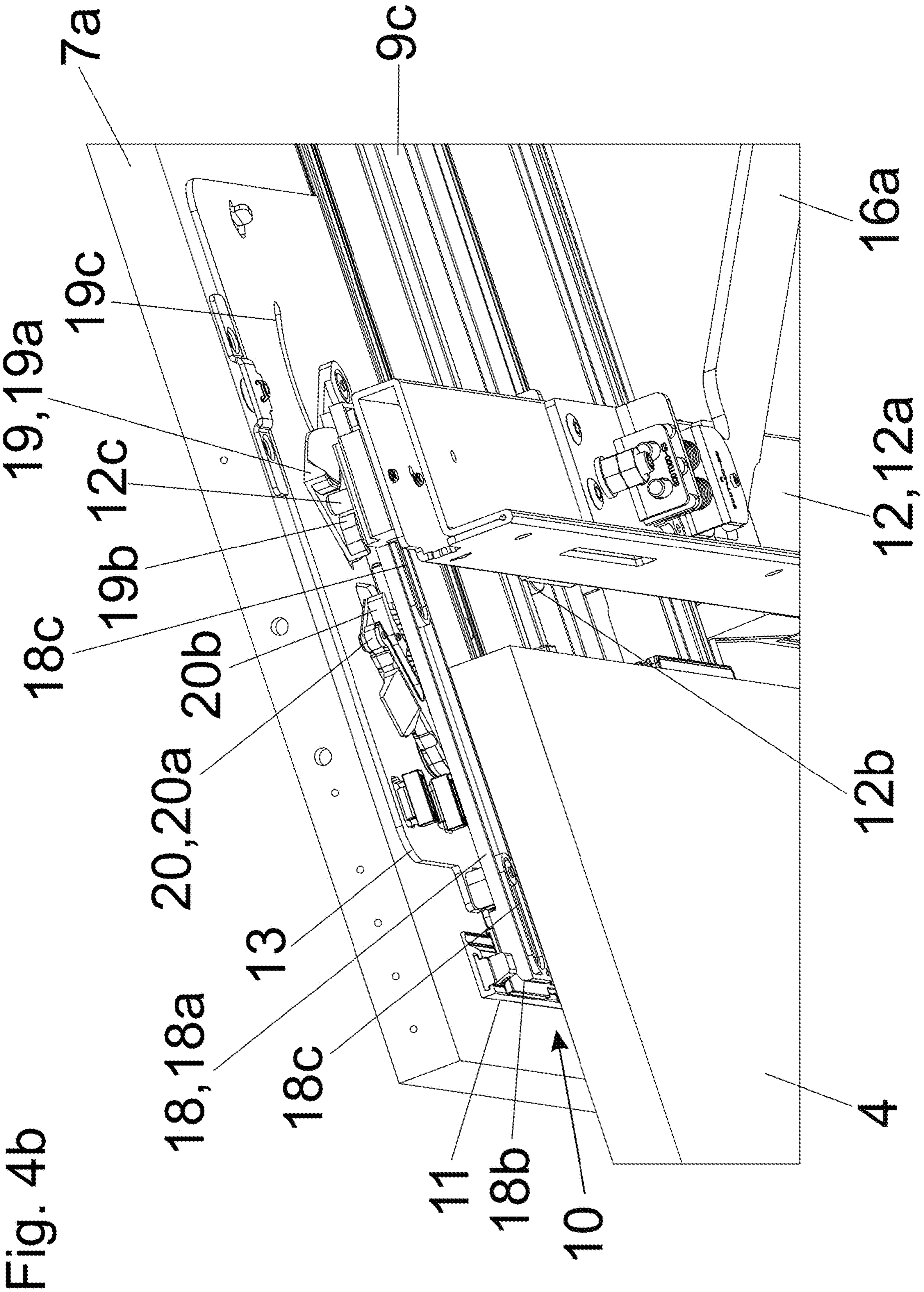

- includes at least one pivotally supported coupling lever 19*a*, preferably wherein the coupling lever 19*a* is supported about a pivoting axis 19*d* (FIG. 6*a*), and/or
- includes a least one, preferably funnel-shaped, notch 19*b*, the notch 19*b* being configured to be releasably coupled to an actuator 12*c* arranged on the at least one guiding device 12, and/or
- can be displaceably supported along a, preferably arc-shaped, guiding contour 19*c* (FIG. 4*b*).

In the shown FIG. 4*a*, the guiding device 12 is in an uncoupled condition with the coupling device 19, because the actuator 12*c* of the guiding device 12 is spaced from the coupling lever 19*a* of the coupling device 19. The cover 11 is thereby located in the first operating position in which the front face 15 of the guide rail 9*c* and/or the gap 10 formed between the stationary furniture part 7*a* and the door wing 4 can be covered.

Upon a continued movement of the guiding device 12, the at least one rolling body 12*b* of the carrier 12*a* is moved along the guide rail 9*c*, until the actuator 12*c* of the carrier 12*a* enters the notch 19*b* of the coupling lever 19*a* of the coupling device 19. The coupling lever 19*a* is then pivoted about the pivoting axis 19*d* (FIG. 6*a*) so as to trigger the actuating device 18.

According to an embodiment, it can be provided that the actuating device 18

- includes at least one linearly displaceable slider 18*a*, and/or
- is, preferably hingedly, connected to the at least one coupling device 19, and/or
- includes at least one longitudinal guide 18*c* by which the actuating device 18 can be displaced at least in a direction extending parallel to a longitudinal direction (L) of the at least one guide rail 9*c*, and/or
- includes at least one inclined surface 18*b* for actuating the at least one cover 11.

According to an embodiment, at least one adjustment device 23 can be provided for adjusting a position of the at least one mounting member 13 relative to the at least one guide rail 9*c*, preferably in a direction extending parallel to a longitudinal direction (L) of the at least one guide rail 9*c*.

FIG. 4*b* shows the guiding device 12 in a coupled condition with the coupling device 19. The actuator 12*c* of the guiding device 12 is located within the notch 19*b* of the coupling lever 19. It can be seen that the slider 18*a* of the actuating device 18 has been linearly displaced, from the position shown in FIG. 4*a* to the position of FIG. 4*b*, by the pivoting movement of the coupling lever 19*a*. The cover 11 has been pivoted from the first operating position into the second operating position by the inclined surface 18*b* of the slider 18*a*. In the second operating position, the cover 11 at least partially reveals the gap 10 and/or the front face 15 of the guide rail 9*c*.

Figure 5A:
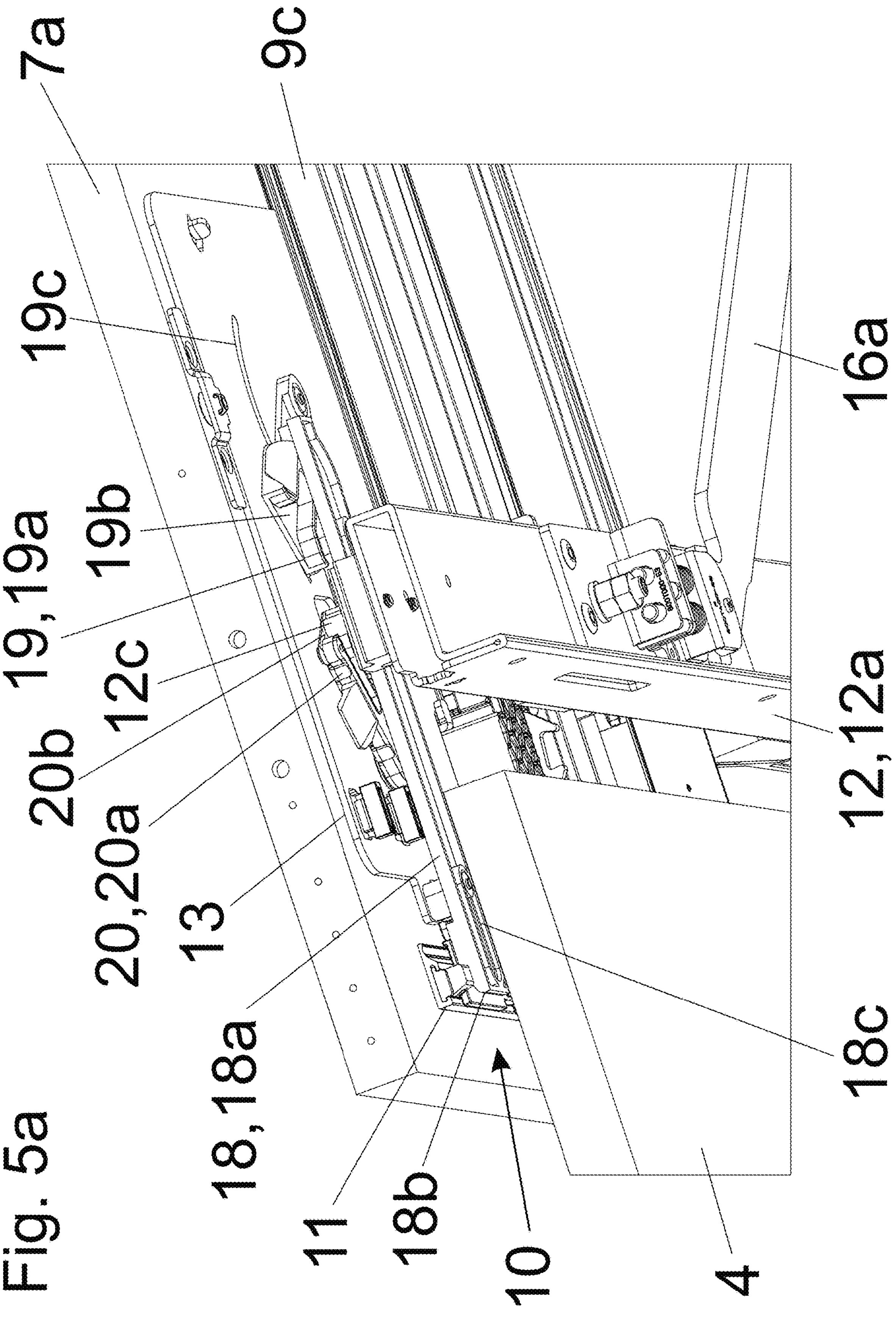
FIG. 5*a*, 5*b* show further positions of the guiding device in a direction of the extended end position.

FIG. 5*a* shows that the guiding device 12 can be again decoupled from the coupling device 19 upon a continued movement in a direction of the extended end position, because the actuator 12*c* of the guiding device 12 has been released from the coupling lever 19*a* of the coupling device 19. Now, the holding device 20 comes into action by which the guiding device 12 can be held in position relative to the at least one guide rail 9*c* in the extended end position. It can be preferably provided that the guiding device 12 can be driven by the holding device 20 from a partial section immediately preceding the extended end position into the extended end position, for example by a force of a spring element 20*c* (FIG. 5*b*).

According to an embodiment, it can be provided that the holding device 20

- includes at least one pivotally supported tilting lever 20*a*, preferably wherein the tilting lever 20*a* is pivotable about a pivoting axis, and/or
- includes at least one, preferably funnel-shaped, notch 20*b* configured to be releasably coupled to an actuator 12*c* arranged on the at least one guiding device 12, and/or
- includes at least one spring element 20*c* for applying a force to the at least one holding device 20.

Figure 5B:
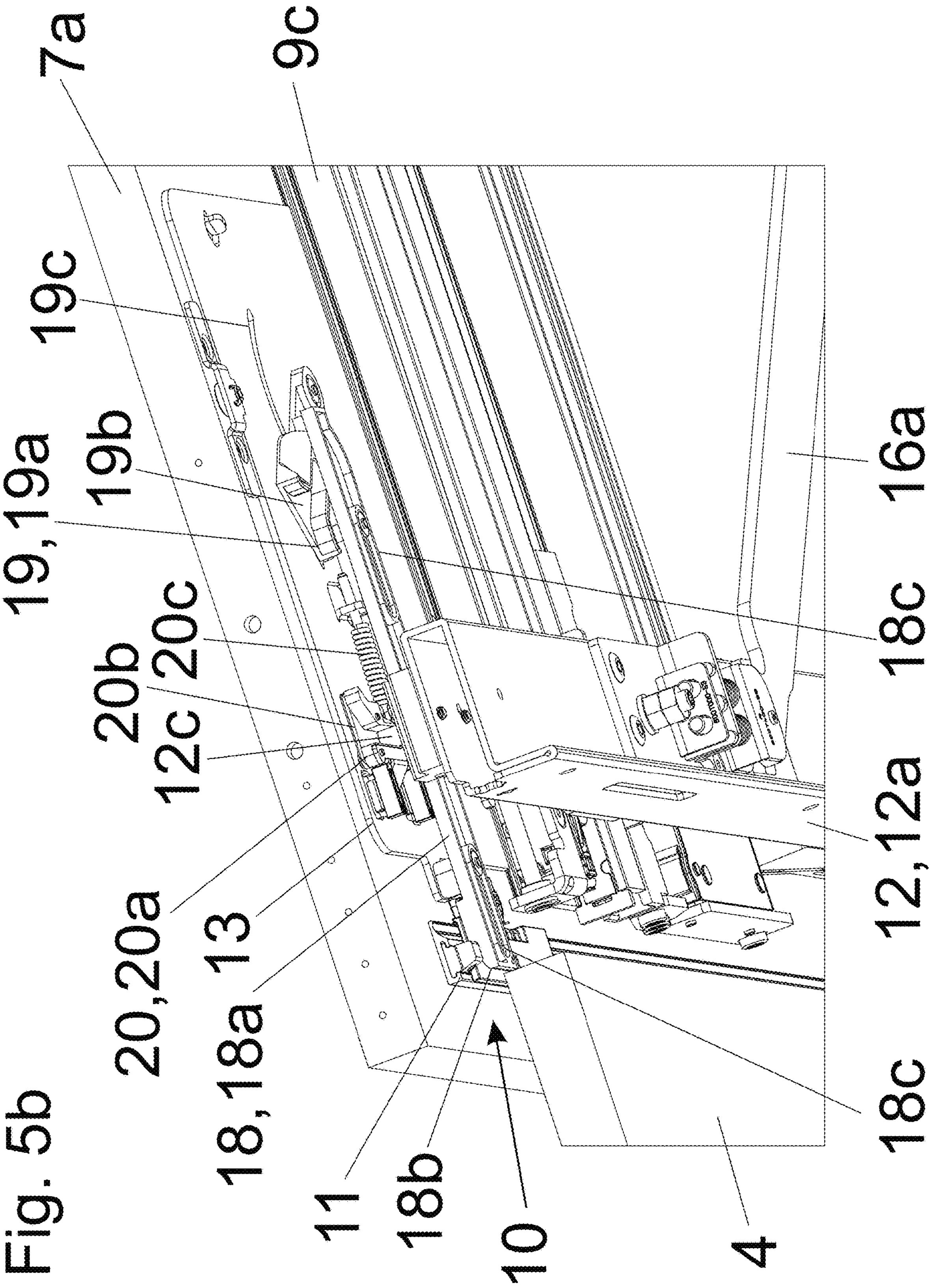

FIG. 5*b* shows that the guiding device 12 with the carrier 12*a* has been moved into the extended end position by a force of the spring element 20*c* of the holding device 20, and the guiding device 12 is held in position in the extended end position with a predetermined force.

FIG. 6*a*-6*h* show the movement of the guiding device 12 towards the extended end position in temporal sequences. FIG. 6*a* shows the mounting member 13 on which the coupling device 19, the actuating device 18 and the holding device 20 are arranged.

The cover 11 is hingedly connected to the mounting member 13 via at least one hinge 21. The hinge 21 for supporting the cover 11 can include a return device 21*a*, preferably having a return spring, configured to return the cover 11 from the second operating position into the first operating position.

For the sake of clarity, only the actuator 12*c* from the guiding device 12 is shown. The actuator 12*c* approaches towards the coupling device 19 upon a movement of the guiding device 12 in a direction of the extended end position, and eventually co-operates with the coupling lever 19*a* of the coupling device 19, namely in that the actuator 12*c* enters into the notch 19*b* of the coupling lever 19*a*. This situation is shown in FIG. 6*a*.

Figure 6B:
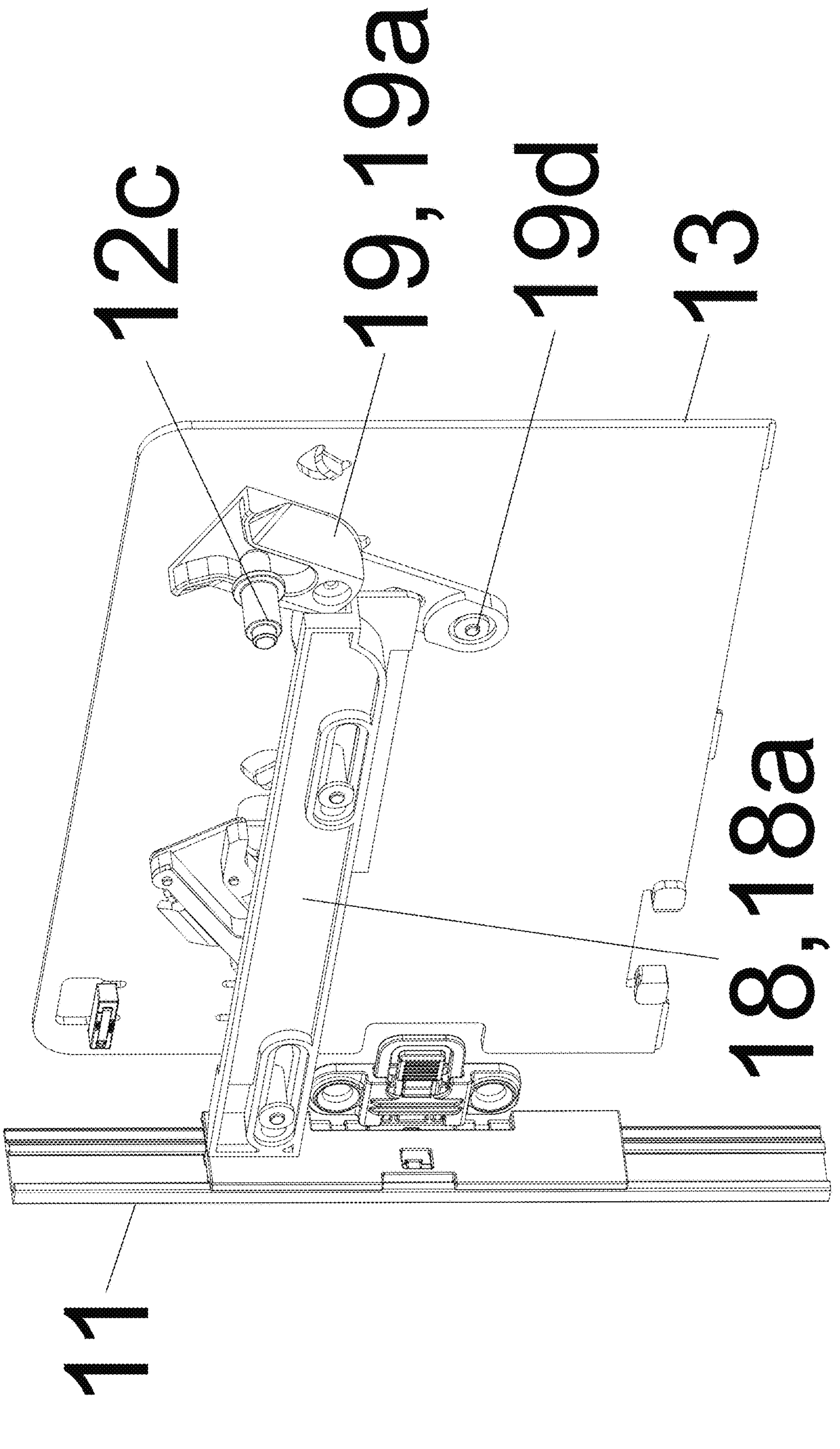

Upon a continued movement of the actuator 12*c*, the coupling lever 19*a* of the coupling device 19 is pivoted about the pivoting axis 19*d*. As a result, the actuating device 18 for actuating the cover 11 can also be triggered (FIG. 6*b*). In the shown embodiment, the slider 18*a* of the actuating device 18 is hingedly connected to the coupling lever 19*a* of the coupling device 19, and the slider 18 is linearly displaceable by a pivoting movement of the coupling lever 19*a*.

In this way, it can be ensured that the cover 11 is moved before the guiding device 12 reaches the extended end position.

Figure 6C:
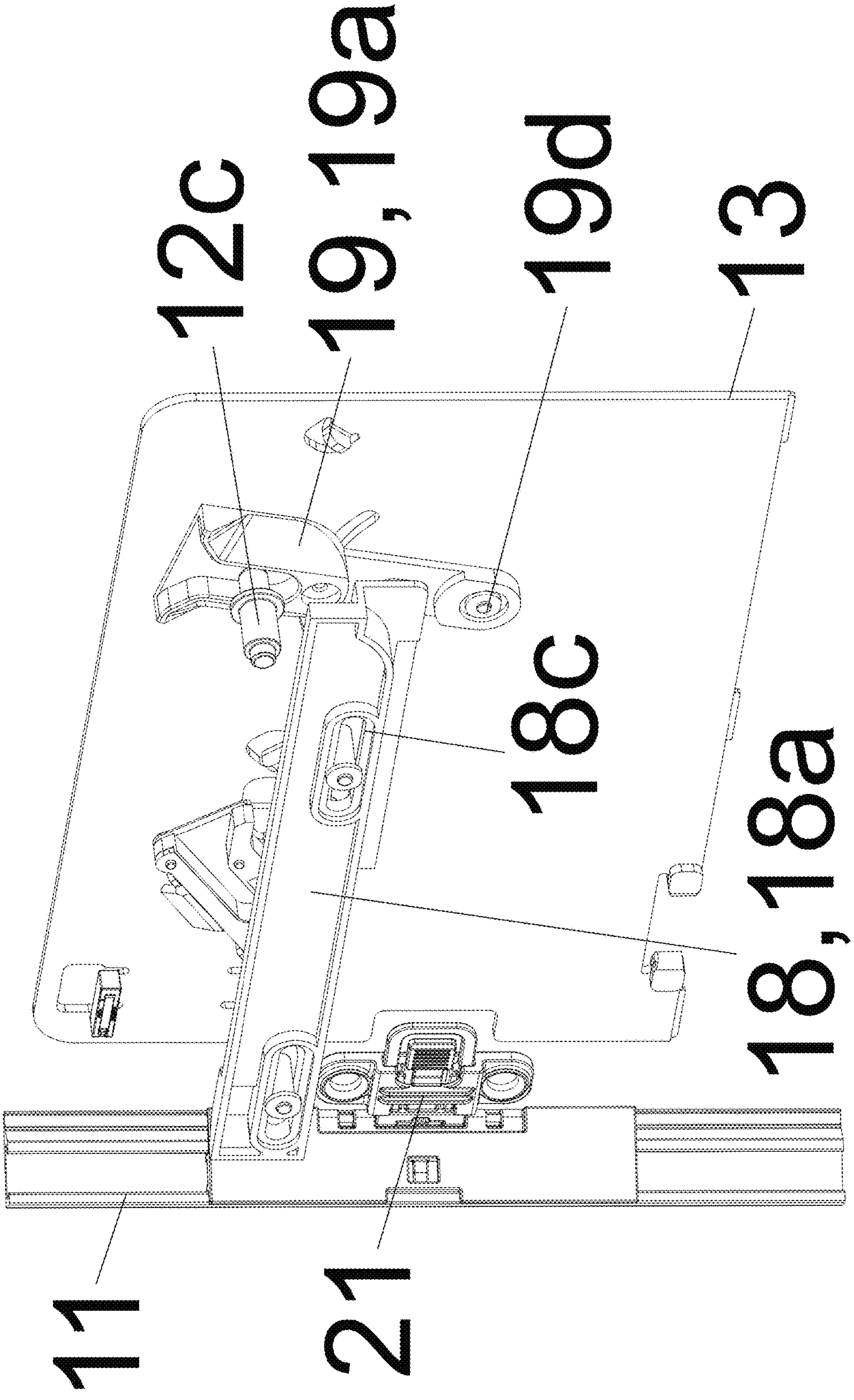
Figure 6D:
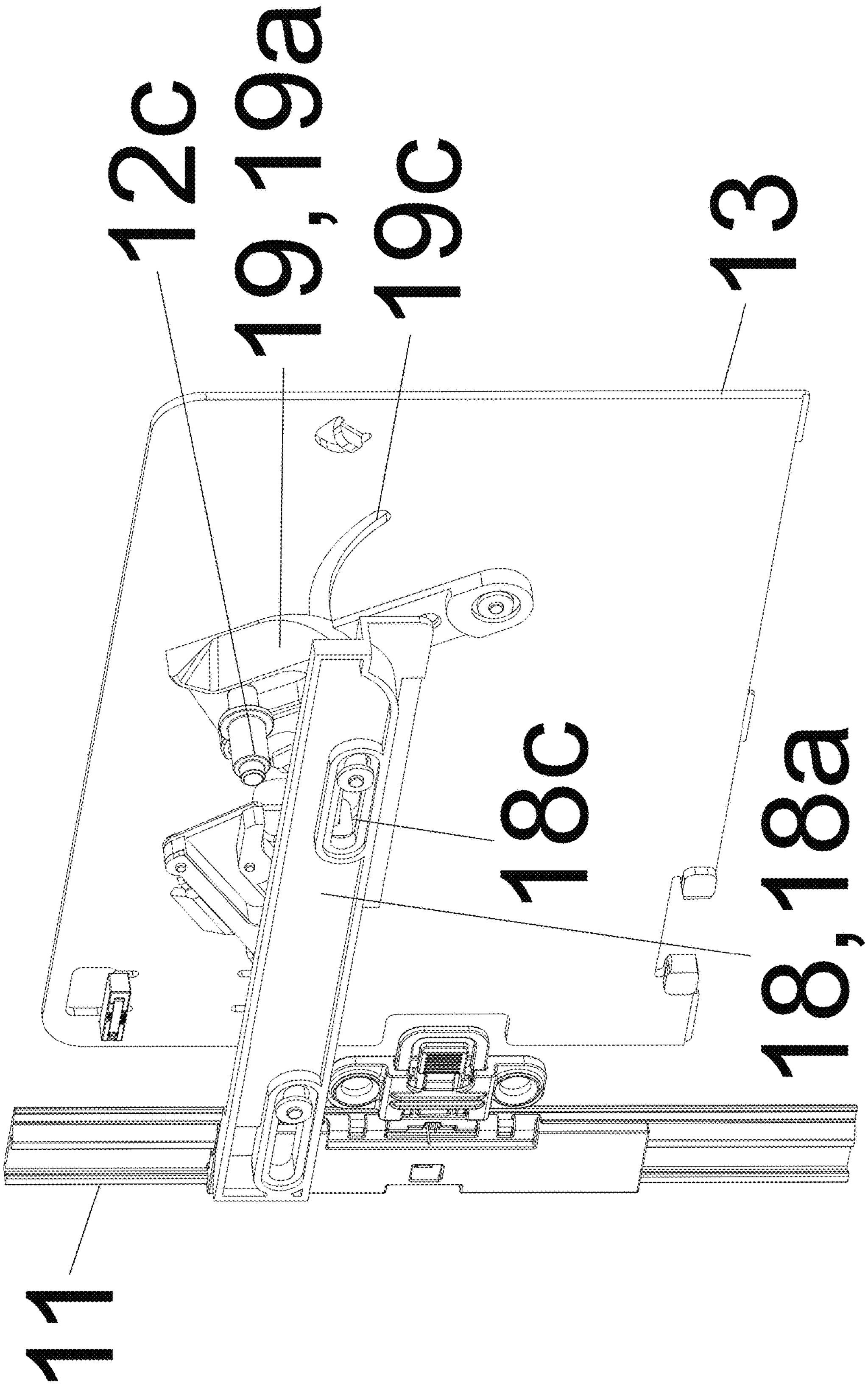

Upon a continued movement of the actuator 12*c* in a direction of the extended end position, the cover 11 is actuated by the slider 18*a*. The linear displaceability of the slider 18*a* can be made possible by the longitudinal guides 18*c* (FIG. 6*c*, FIG. 6*d*).

Figure 6E:
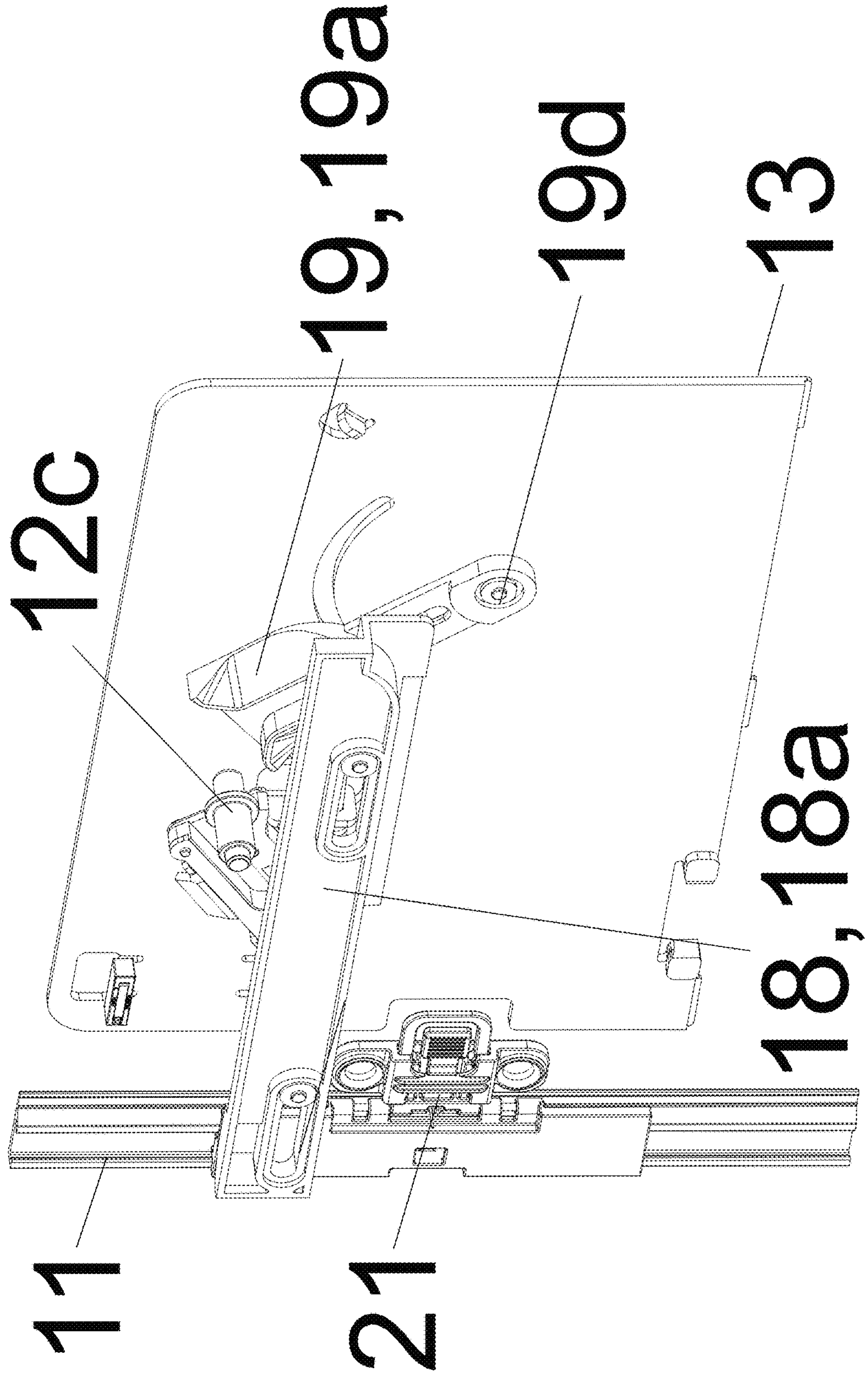

Upon a continued movement of the actuator 12*c* in a direction of the extended end position, the actuator 12*c* is again decoupled from the coupling device 19. Accordingly, the actuator 12*c* is neither engaged with the coupling device 19 nor with the holding device 20 (FIG. 6*e*).

Figure 6F:
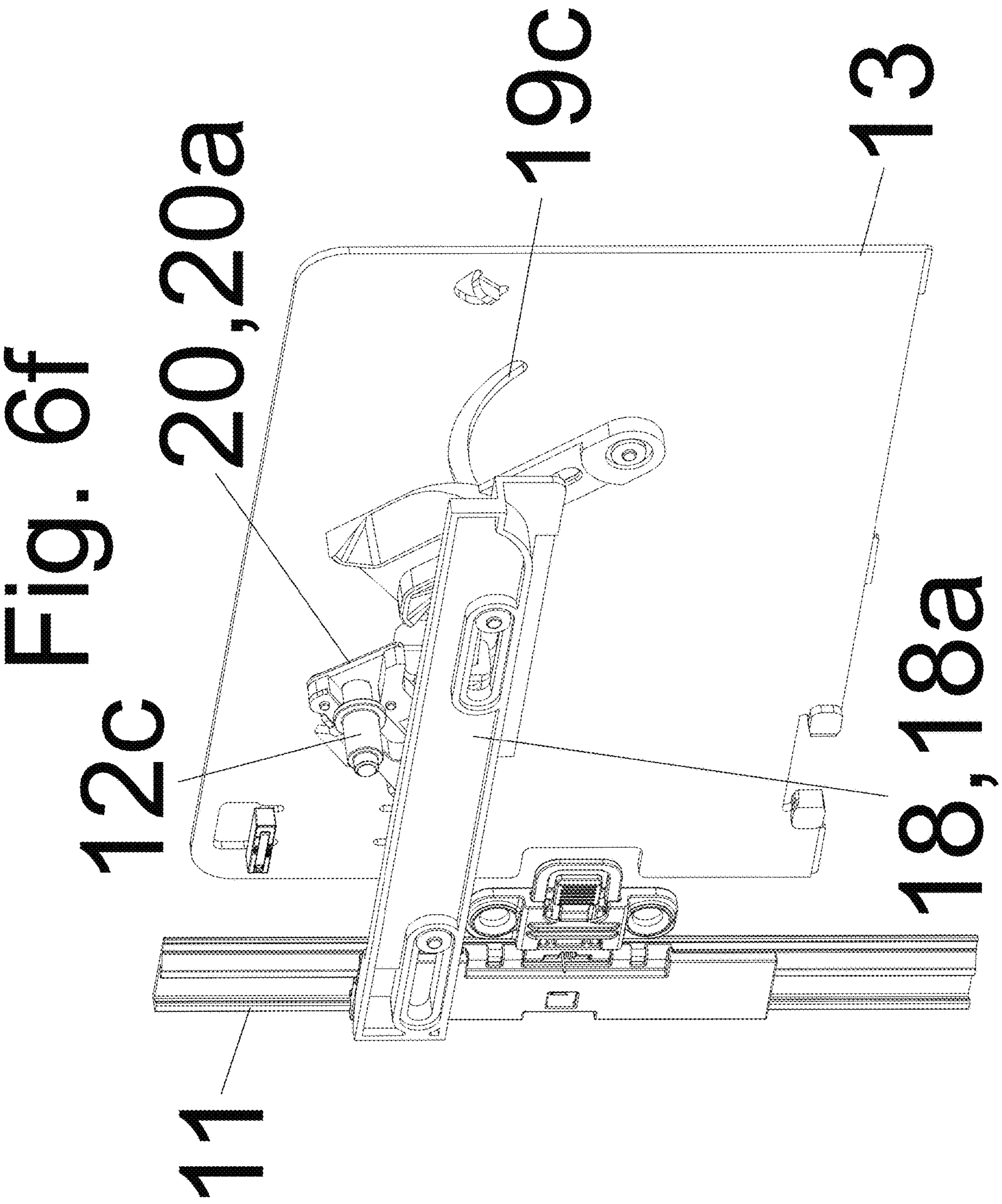
Figure 6G:
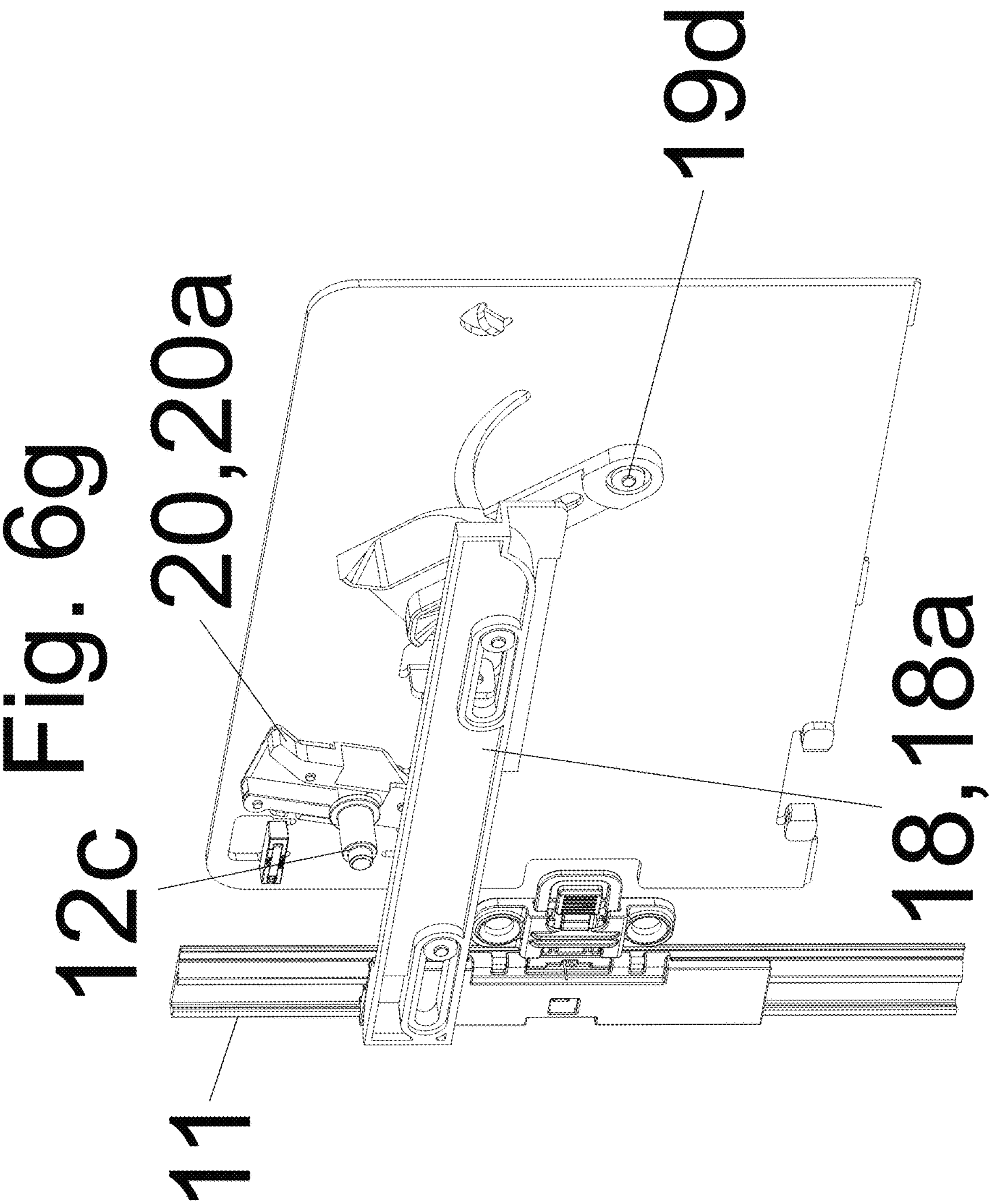
Figure 6H:
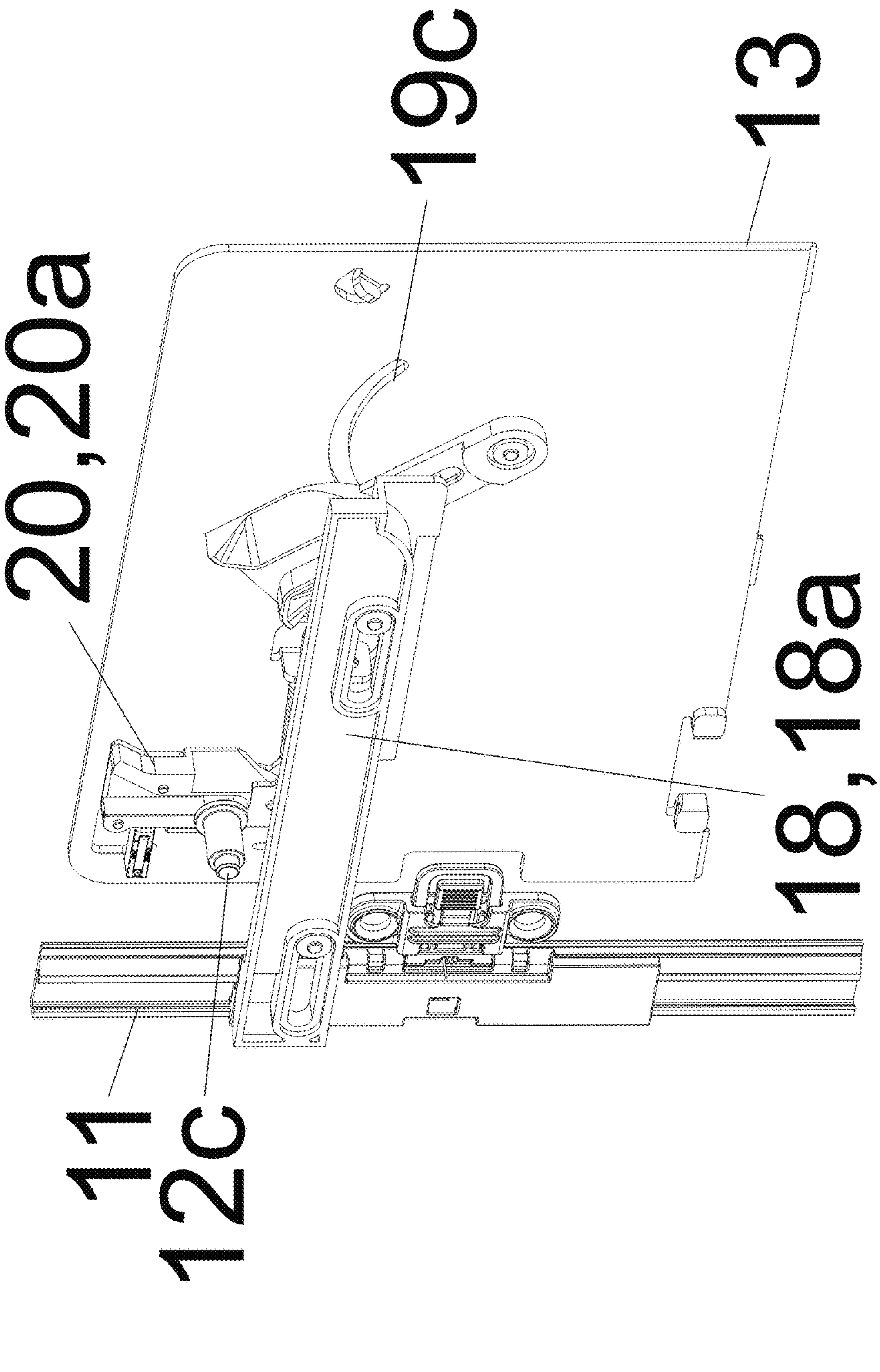

In FIG. 6*f*, the actuator 12*c* can be coupled with the holding device 20, namely in that the actuator 12*c* moves into the notch 20*b* of the tilting lever 20*a*. By a continued movement of the actuator 12*c* in a direction of the extended end position, the tilting lever 20*a* of the holding device 20 is pivoted (FIG. 6*g*). The actuator 12*c* (and therewith an entirety of the guiding device 20 with the carrier 20*a* and the door wing 4 supported thereon) can be driven by a force of the spring element 20*c* of the holding device 20 until reaching the extended end position (FIG. 6*h*).

The method for moving at least one movably-supported door wing 4 relative to at least one stationary furniture part 7*a* by at least one guide system 8 is characterized by the following method steps:

- the at least one guiding device 12 is moved from the retracted end position in a direction of the extended end position along the at least one guide rail 9*c*,
- the at least one guiding device 12 is releasably coupled by the at least one coupling device 18 to the at least one actuating device 18 in a partial section of the at least one guide rail 9*c*, the partial section, preferably immediately, preceding the extended end position,
- the at least one actuating device 18, in a coupled condition with the at least one guiding device 12, is entrained by the at least one guiding device 12 in a direction of the extended end position, and
- the at least one cover 11 is moved from the first operating position into the second operating position by the at least one actuating device 18.

In a further method step, it can be provided that the at least one guiding device 12, upon a continued movement in a direction of the extended end position, is decoupled from the at least one actuating device 18.

According to an embodiment, it can be provided that at least one holding device 20 is provided so as to hold the at least one guiding device 12 relative to the at least one guide rail 9*c* in the extended end position. In a further method step, the at least one guiding device 12 is held in the extended end position by the at least one holding device 20.

In a further method step, the at least one guiding device 12 is moved from the extended end position in a direction of the retracted end position along the at least one guide rail 9*c*. The at least one guiding device 12 is releasably coupled to the at least one actuating device 18 by the at least one coupling device 19. The at least one actuating device 18, in a coupled condition with the at least one guiding device 12, is entrained in a direction of the retracted end position by the at least one guiding device 12.

Figure 7A:
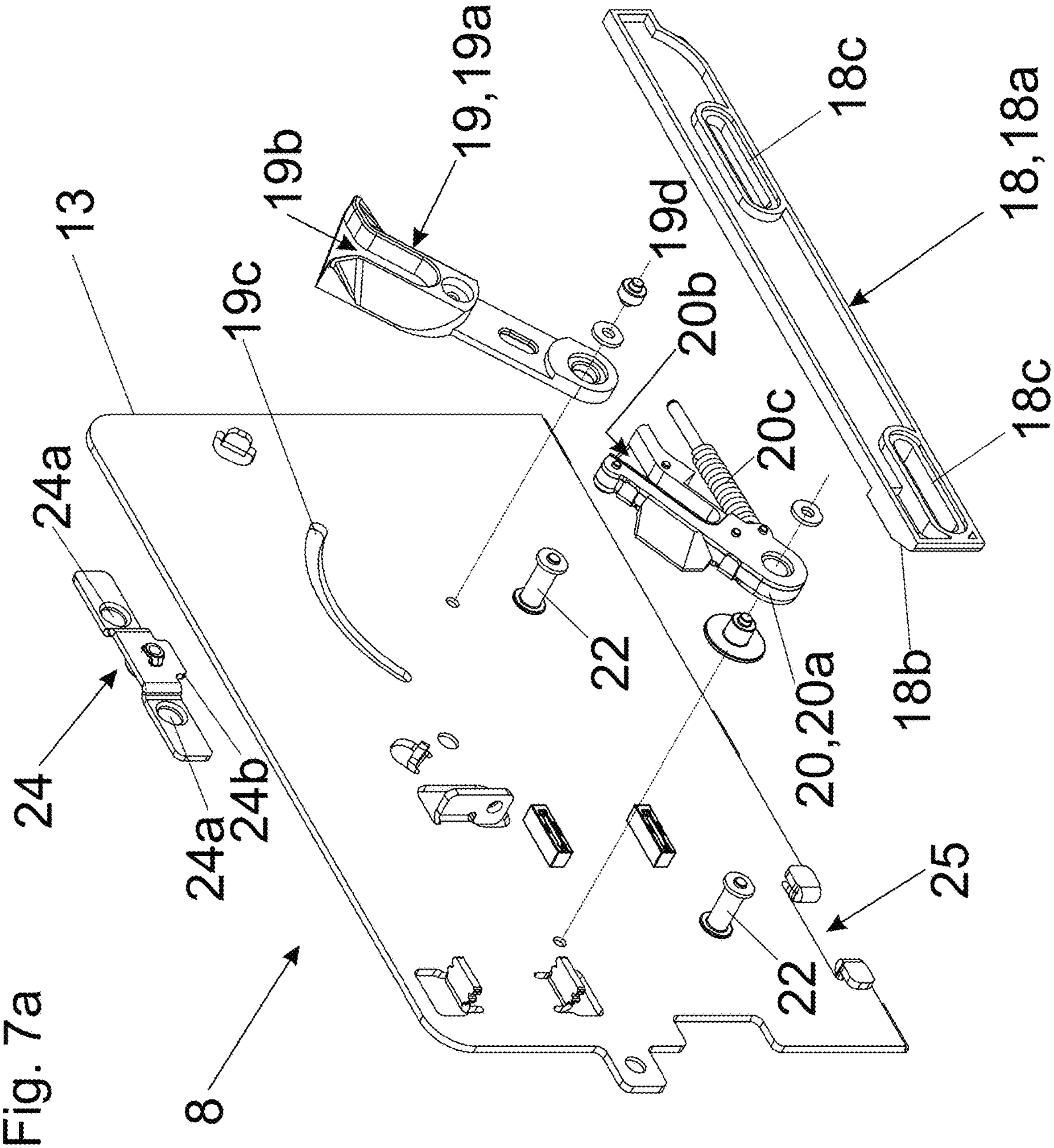
FIG. 7*a*, 7*b* show a part of the guide system in an exploded view and in an assembled condition.

FIG. 7*a* shows a part of the guide system 8 in an exploded view. The mounting member 13 is to be fixed to the stationary furniture part 7*a*. The coupling device 19 with the coupling lever 19*a*, the actuating device 18 with the slider 18*a*, and the holding device 20 with the tilting lever 20*a* are supported on the mounting member 13. The mounting member 13 includes a, preferably arc-shaped, guide contour 19*c* for displaceably supporting the coupling device 19. Moreover, guide elements 22 are provided, the guide elements 22 being displaceably guided in the longitudinal guides 18*c* of the slider 18*a*.

In order to provide an adjustment of the mounting member 13 relative to the guide rail 9*c* by the adjustment device 23 shown in FIG. 3*c*, the mounting member 13 is to be mounted to the stationary furniture part 7*a* via a holding portion 24. The holding portion 24 includes at least one fastening location 24*a* for mounting to the stationary furniture part 7*a*. The at least one fastening location 24*a* can be in the form of a hole for the passage of a screw for example.

The holding portion 24 includes at least one guide limb 24*b*, and the panel-shaped mounting member 13 can be displaceably guided between the stationary furniture part 7*a* and the guide limb 24*b* in a mounted condition. The mounting member 13 is adjustable in the longitudinal direction (L) to the guide rail 9*c* by the adjustment device 23. The mounting member 13 includes a recess 25, and a setting member configured to be adjusted by the adjustment device 23 engages into the recess 25 so as to displace the mounting member 13 relative to the guide rail 9*c*. In this way, the extended end position of the guiding device 12 can be variably adjusted by the adjustment device 23.

Figure 7B:
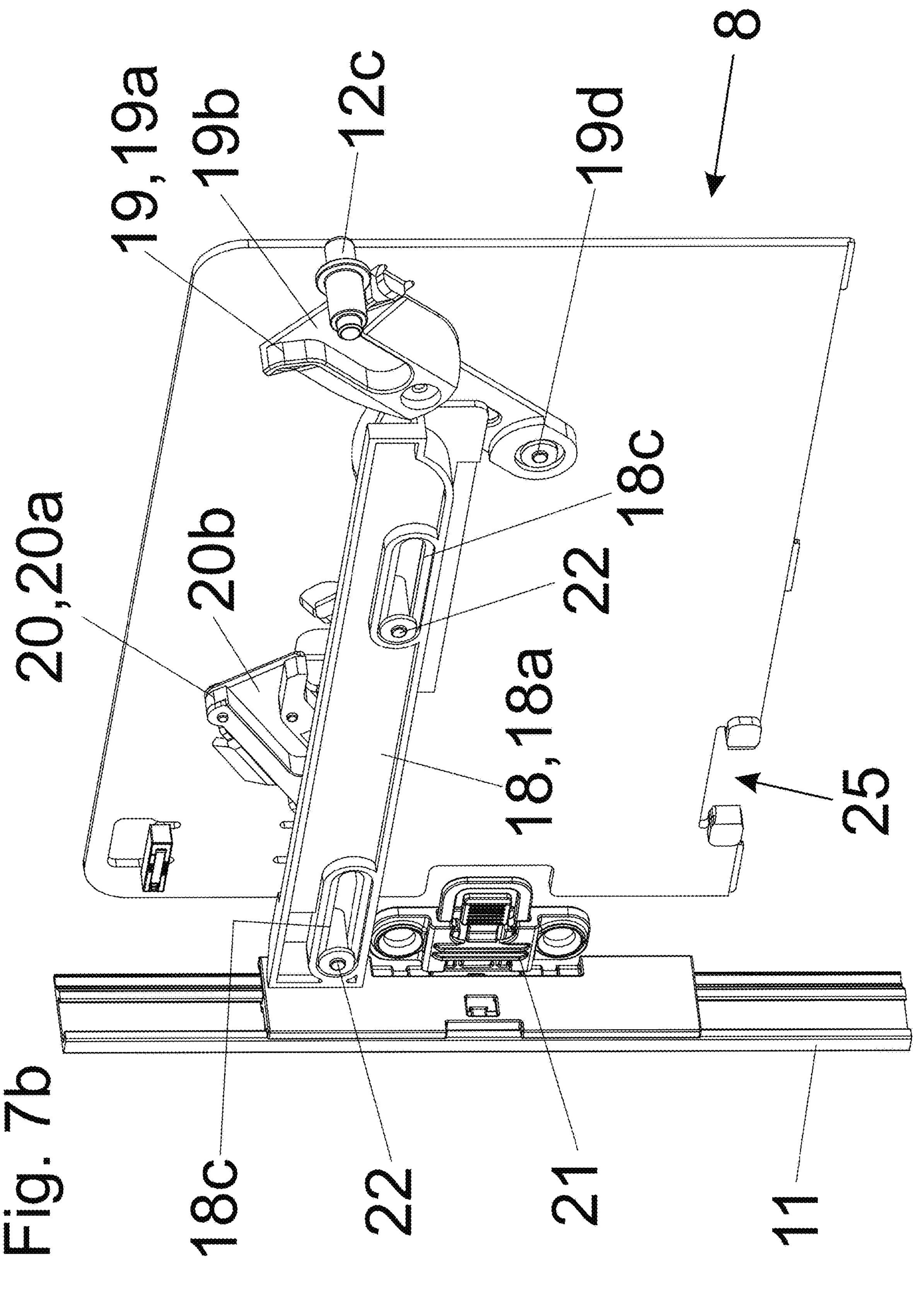

FIG. 7*b* shows the guide system 8 with the mounting member 13 and the pivotally supported cover 11 in an assembled condition.

The invention claimed is:

1. A guide system for guiding a movably-supported door wing relative to a stationary furniture part, the guide system comprising:

- a guide rail configured to be arranged on the furniture part,
- a guiding device configured to pivotally support the door wing thereon, the guiding device being movably supported between a retracted end position and an extended end position along the guide rail,
- a cover configured to cover at least one front face of the guide rail, the cover being movable between a first operating position, in which the cover at least partially covers the at least one front face of the guide rail, and a second operating position, in which the cover at least partially reveals the front face,
- an actuating device for moving the cover from the first operating position into the second operating position, and
- a coupling device configured to releasably couple the guiding device to the actuating device in a partial section of the guide rail, the partial section preceding the extended end position, wherein the actuating device is configured to, in a coupled condition with the guiding device, be entrained by the guiding device so as to move the cover from the first operating position into the second operating position.

2. The guide system according to claim 1, wherein the guiding device and the actuating device are decoupled from one another in the extended end position and/or in a further partial section between the retracted end position and the extended end position, the further partial section preceding the partial section in which the guiding device can be releasably coupled to the actuating device.

3. The guide system according to claim 1, wherein the actuating device:

- includes a linearly displaceable slider, and/or
- is connected to the coupling device, and/or includes a linear guide configured to allow the actuating device to be displaced in a direction extending parallel to a longitudinal direction of the guide rail, and/or includes an inclined surface for actuating the cover.

4. The guide system according to claim 1, wherein the coupling device:

includes a pivotally supported coupling lever, and/or includes a notch configured to be releasably coupled to an actuator arranged on the guiding device, and/or is displaceably supported along a guide contour.

5. The guide system according to claim 1, wherein the guide system includes a holding device for holding the guiding device in the extended end position relative to the guide rail.

6. The guide system according to claim 1, wherein the guiding device includes:

a carrier for pivotally supporting the door wing, and/or an actuator configured to couple the guiding device to the coupling device and/or to a holding device for holding the guiding device in the extended end position relative to the guide rail, and/or a rolling body configured to be displaced along the guide rail.

7. The guide system according to claim 1, wherein the guide system includes a mounting member configured to be fixed to the stationary furniture part, wherein the actuating device, the coupling device, and/or a holding device for holding the guiding device in the extended end position relative to the guide rail are supported on the mounting member.

8. The guide system according to claim 1, further comprising a hinge for movably supporting the cover, wherein the hinge includes a return device configured to return the cover from the second operating position into the first operating position.

9. The guide system according to claim 1, wherein the guide system includes:

an ejection device for ejecting the guiding device from the retracted end position in a direction of the extended end position, and/or a compensation device for compensating for a tilting movement of the guiding device about a tilting axis by a return moment, and/or with the guide rail being a first guide, a second guide rail, the first guide rail and the second guide rail to be fixed to the stationary furniture part so as to be mutually spaced from each other in a height direction.

10. A method for moving the movably-supported door wing relative to the stationary furniture part using the guide system according to claim 1, the method comprising:

moving the guiding device along the guide rail from the retracted end position in a direction of the extended end position, releasably coupling the guiding device by the coupling device to the actuating device in a partial section of the guide rail, the partial section preceding the extended end position, entraining the actuating device, in a coupled condition with the guiding device, by the guiding device in a direction of the extended end position, and moving the cover from the first operating position into the second operating position by the actuating device.

11. The method according to claim 10, further comprising decoupling the guiding device from the actuating device upon a continued movement in a direction of the extended end position.

12. The method according to claim 10, wherein the guide system further includes a holding device for holding the guiding device in the extended end position relative to the guide rail, and the method further comprising holding the guiding device in the extended end position using the holding device.

13. The method according to claim 10, further comprising:

moving the guiding device from the extended end position in a direction of the retracted end position along the guide rail, releasably coupling the guiding device to the actuating device by the coupling device, and entraining the actuating device, in a coupled condition with the at least one guiding device, by the guiding device in a direction of the retracted end position.

14. An item of furniture comprising:

a door wing, a stationary furniture part, and the guide system according to claim 1 for guiding the door wing, the item of furniture further comprising:

an inner space configured to be at least partially covered by the door wing, wherein kitchen furniture and kitchenware are to be arranged in the inner space, and/or a receiving compartment for at least partially receiving the door wing, the receiving compartment extending in a depth direction of the item of furniture.

15. The guide system according to claim 1, wherein the partial section immediately precedes the extended end position.

16. The guide system according to claim 2, wherein the further partial section immediately precedes the partial section.

17. The guide system according to claim 3, wherein the actuating device is hingedly connected to the coupling device.

18. The guide system according to claim 4, wherein the coupling device includes a pivotally supported coupling lever pivotally supported about a pivoting axis, and/or includes a funnel-shaped notch configured to be releasably coupled to an actuator arranged on the guiding device, and/or is displaceably supported along an arc-shaped guide contour.

19. The guide system according to claim 5, wherein the holding device includes:

a pivotally supported tilting lever, the tilting lever being pivotally supported about a pivoting axis, and/or a funnel-shaped notch configured to be releasably coupled to an actuator arranged on the guiding device, and/or a spring element for applying a force to the holding device.

20. The guide system according to claim 7, further comprising an adjustment device configured to adjust a position of the mounting member relative to the guide rail in a direction extending parallel to a longitudinal direction of the guide rail.

21. The guide system according to claim 8, wherein the return device includes a return spring.

22. The guide system according to claim 9, wherein the ejection device is releasably lockable, and/or wherein the compensation device includes a scissor mechanism and/or a cable device, and/or wherein the guiding device is movably supported along the guide rails.

23. The method according to claim 10, wherein the partial section immediately precedes the extended end position.

24. The item of furniture according to claim 14, wherein the door wing is a sliding door or a folding-sliding-door.

* * * * *